(12) United States Patent
Barabas et al.

(10) Patent No.: US 9,092,411 B2
(45) Date of Patent: Jul. 28, 2015

(54) UNDERSTANDING DATA IN DATA SETS

(75) Inventors: Albert B. Barabas, Fitchburg, WI (US);
Mark D. A. Van Gulik, Madison, WI (US); Terry Raymond, Tiverton, RI (US)

(73) Assignee: Miosoft Corporation, Madison, WI (US)

( * ) Notice: Subject to any disclaimer, the term of this patent is extended or adjusted under 35 U.S.C. 154(b) by 278 days.

(21) Appl. No.: 12/542,969

(22) Filed: Aug. 18, 2009

(65) Prior Publication Data

US 2011/0047186 A1 Feb. 24, 2011

(51) Int. Cl.
*G06F 7/00* (2006.01)
*G06F 17/24* (2006.01)
*G06F 17/30* (2006.01)

(52) U.S. Cl.
CPC ............ *G06F 17/245* (2013.01); *G06F 17/246* (2013.01); *G06F 17/30115* (2013.01)

(58) Field of Classification Search
USPC ............ 707/609, 821, 999.102, 999.104, 758
See application file for complete search history.

(56) References Cited

U.S. PATENT DOCUMENTS

| | | | |
|---|---|---|---|
| 6,037,938 A | 3/2000 | Wolké | |
| 6,236,986 B1 | 5/2001 | Gestrelius et al. | |
| 7,216,132 B1 | 5/2007 | Flam | |
| 7,310,635 B2 * | 12/2007 | Tucker | 1/1 |
| 7,512,610 B1 * | 3/2009 | Barabas et al. | 1/1 |
| 7,783,655 B2 | 8/2010 | Barabas et al. | |
| 2002/0107841 A1 * | 8/2002 | Hellerstein et al. | 707/3 |
| 2003/0014391 A1 * | 1/2003 | Evans et al. | 707/1 |
| 2006/0026199 A1 | 2/2006 | Crea | |
| 2008/0033960 A1 | 2/2008 | Banks et al. | |
| 2009/0288026 A1 * | 11/2009 | Barabas et al. | 715/764 |
| 2010/0010960 A1 * | 1/2010 | Singh | 707/2 |

FOREIGN PATENT DOCUMENTS

WO  WO 2011/022446  2/2011

OTHER PUBLICATIONS

PAIR Transaction History for U.S. Appl. No. 11/241,571, filed Sep. 30, 2005.
PAIR Transaction History for U.S. Appl. No. 12/413,751, filed Mar. 30, 2009, pending claims and application as filed.
International Preliminary Report on Patentability for App. Ser. No. PCT/US10/045823, dated Feb. 21, 2012; pp. 1-7.
International Search Report for App. Ser. No. PCT/US10/45823, mailed Oct. 8, 2010, 12 pages.
MioSoft® Business Data Tool™ User Guide, Version 9.3, MioSoft Corporation, Madison, Wisconsin, 318 pages (2009).

(Continued)

*Primary Examiner* — Hosain Alam
*Assistant Examiner* — Eliyah S Harper
(74) *Attorney, Agent, or Firm* — Fish & Richardson P.C.

(57) ABSTRACT

Among other things, there are two or more data sets. Each of the data sets contains data that can be interpreted as records each having data values for data fields. Each of the data sets contains at least some data that is related to data in at least one of the other data sets. The data in different data sets is organized or expressed possibly differently. Each of the data sets is susceptible to a definition of a key for the records of the data set. The data sets are characterized by repetitions of at least one of (a) records, (b) portions of keys, or (c) instances of values for data fields. Information about at least one of the repetitions is provided to a user.

32 Claims, 22 Drawing Sheets

(56) References Cited

OTHER PUBLICATIONS

Figure 1:
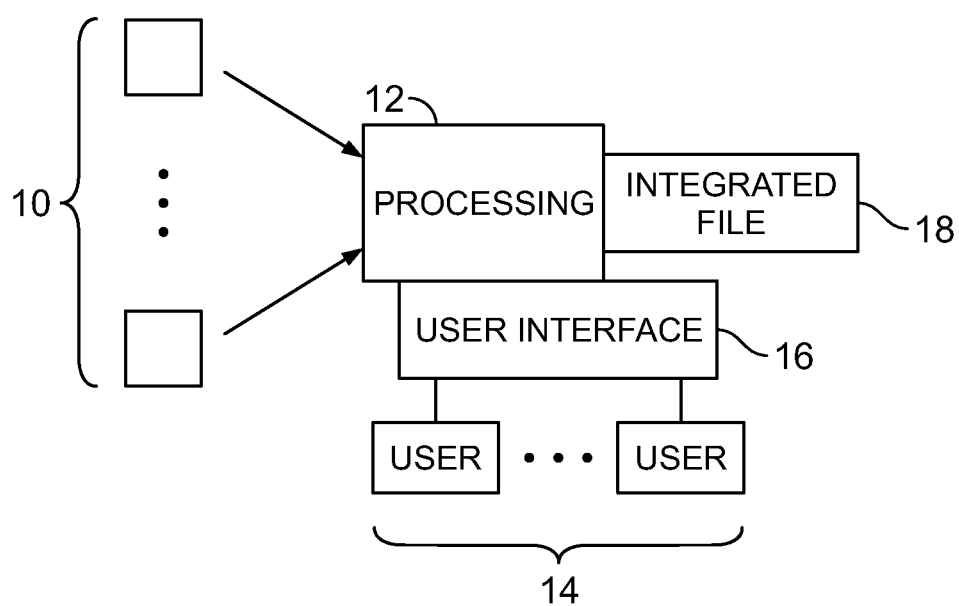

PAIR Transaction History for U.S. App. No. 12/413,751, filed Mar. 30, 2009.

Business Data Tool™ Overview from MioSoft Corporation of Madison, Wisconsin [online], [retrieved on Feb. 8, 2010]. Retrieved from the Internet: http://www.miosoft.com/index.php?id=27.

* cited by examiner

|  | A1 | ▶ | fx | 69.102 | | |
|---|---|---|---|---|---|---|
|  | A | B | C | D | E | F |
| 1 | 69.102 | Data Migrator | | | | |
| 2 | 69.208 | Configurable Parser | | | | |
| 3 | 95.105 | Viewer and Analyzer | | | | |
| 4 | 95.106 | Business Intelligence Creator | | | | |
| 5 | 95.204 | Context Server | | | | |
| 6 | 95.202 | Business Data Tools Workshops 1 | | | | |
| 7 | 95.402 | Business Data Tools Workshops 2 | | | | |
| 8 | | | | | | |
| 9 | | | | | | |
| 10 | | | | | | |

FIG. 3

| | A | B | C | D | E | f |
|---|---|---|---|---|---|---|
| 1 | 103327885 | ZABRINA | WIECKS | 10300 W BLUEMOUND RD APT 310|TURING|UTAH~10300 W BLUEMOUND RD APT 310|TURING|UTAH|69.208 | b | 4 |
| 2 | 103327885 | ZABRINA | WIECKS | 10300 W BLUEMOUND RD APT 310|TURING|UTAH~10300 W BLUEMOUND RD APT 310|TURING|UTAH|95.106 | a | 3 |
| 3 | 106048507 | CONN | SECREASE | 6522 MAYBERRY RD|TURING|UTAH~5697 N HANSON ST|SOUTH MILWAUKEE|DELAWARE|95.204 | b | 2.5 |
| 4 | 112359804 | DANNIELL | STEFFERUD | 614 RUSK ST|TURING|UTAH~W3162 650TH AVE|LACONA|ILLINOIS|95.106 | a | 2.5 |
| 5 | 118623511 | REGINA | TOPALOVIC | 3859 E WHITTAKER AVE|TURING|UTAH~411 ROGERS ST APT 1|BIRNAMWOOD|NEW YORK|69.102 | a | 4 |
| 6 | 125053428 | ROD | THEIS | 5153 N 76TH ST|TURING|UTAH~34 230TH ST|FORESTVILLE|VERMONT|69.102 | a | 4 |
| 7 | 125070889 | GAIGE | ZIEBLER | W2249 OAK FOREST LN|TURING|UTAH~4 AND 1 HALF E FULTON APT 1|NEKOOSA|NEBRASKA|69.102 | a | 1.5 |
| 8 | 125070889 | GAIGE | ZIEBLER | W2249 OAK FOREST LN|TURING|UTAH~4 AND 1 HALF E FULTON APT 1|NEKOOSA|NEBRASKA|69.208 | b | 4 |
| 9 | 128857509 | JOSEPHIT | LILLROSE | 3054 CANAL RD|TURING|UTAH~W287 CTY HIGHWAY H|WAUNAKEE|SOUTH CAROLINA|95.105 | a | 3.5 |
| 10 | 143017784 | KENAN | METKOWSKI | 1807 STONEBRIDGE RD APT 101|TURING|UTAH~1807 STONEBRIDGE RD APT 101|TURING|UTAH|95.204 | a | 3 |
| 11 | 149685290 | CARLEE | SUREE | 328 ANTOINE DR|TURING|UTAH~512 VINE ST APT 2|HAMBURG|ARIZONA|95.204 | a | 2 |
| 12 | 158828479 | KEENON | MATALIK | 8895 STATE HIGHWAY 32|TURING|UTAH~2206 JACKSON ST|OGDENSBURG|IDAHO|69.208 | a | 2 |
| 13 | 170007404 | TODARO | LORFILS | W36 7S2680 MILL POND RD|TURING|UTAH~2313 S WALDEN AVE|ANKENY|DELAWARE|95.204 | a | 2.5 |
| 14 | 172785691 | YVONNE | IBBETSON | N1862 HWY 49|TURING|UTAH~3622 CRESCENT VIEW AVE|FERRYVILLE|ILLINOIS|69.102 | a | 2.5 |
| 15 | 173097990 | LILY | CROMP | 1624 KEARNEY AVE|TURING|UTAH~1201 W WINNEBAGO ST|KEYSTONE|WYOMING|95.204 | b | 2 |
| 16 | 184060019 | KIRSTY | WHIRR | W7037 135TH AVE|TURING|UTAH~845 N KNOWLES AVE|ANKENY|NORTH DAKOTA|69.102 | a | 2 |
| 17 | 184060019 | KIRSTY | WHIRR | W7037 135TH AVE|TURING|UTAH~845 N KNOWLES AVE|ANKENY|NORTH DAKOTA|69.208 | b | 3.5 |
| 18 | 186111196 | SAMANTH | CHAY | 5375 N 34TH ST|TURING|UTAH~830 HARDING ST APT 208|GRANTON|WYOMING|95.204 | a | 3.5 |
| 19 | 191402327 | DARIAS | MILKOWSKA | 9707 W NATIONAL AVE|TURING|UTAH~2268 COBBLESTONE LN|CYLINDER|NORTH CAROLINA|95.105 | a | 2.5 |
| 20 | 191402327 | DARIAS | MILKOWSKA | 9707 W NATIONAL AVE|TURING|UTAH~2268 COBBLESTONE LN|CYLINDER|NORTH CAROLINA|95.204 | a | 1.5 |
| 21 | 191497373 | NICOLLET | DIBLIK | 430 STRATFORD AVE|TURING|UTAH~111 N HAMILTON ST APT 204|GLENFLORA|MARYLAND|95.204 | a | 2 |
| 22 | 194455834 | LINDSEY | GALIONE | 3013 15TH ST ST|TURING|UTAH~1215 DOUGLAS AVE|PILOT MOUND|INDIANA|95.204 | a | 3 |
| 23 | 213081528 | SHMUEL | TIMION | 6220 14TH AVE|TURING|UTAH~301 ROYCE HALL|LA PORTE CITY|MASSACHUSETTS|95.204 | b | 3.5 |
| 24 | 215763057 | RANDELL | TURBERT | 21 FERRY LN|TURING|UTAH~1223 N 26TH ST|DUNCOMBE|ALABAMA|95.204 | a | 2 |
| 25 | 232790124 | MABELLE | OTHMER | 504 MONROE ST|TURING|UTAH~3246 WINDLAND DR|NORTH HUDSON|INDIANA|95.204 | a | 4 |
| 26 | 233087455 | STANLY | PARFIJEWICZ | 235 WINNEBAGO DR APT 215|TURING|UTAH~235 WINNEBAGO DR APT 215|TURING|UTAH|95.204 | a | 4 |
| 27 | 242411141 | LATEISHA | ADITYA | W6346 STATE HIGHWAY 95|TURING|UTAH~2847 WOODALE AVE|BEAMAN|SOUTH DAKOTA|95.204 | a | 3 |
| 28 | 261754166 | RACHEL | SOULARD | 501 1/2 N 4TH ST APT 4|TURING|UTAH~111 W DIVISION ST BOX 1045|KENT|HAWAII|95.204 | a | 3.5 |
| 29 | 282388092 | GINGER | REYESCASTRO | 5735 TUDOR DR|TURING|UTAH~1961 75TH AVE|TONY|VIRGINIA|69.102 | a | 2 |
| 30 | 282388092 | GINGER | REYESCASTRO | 5735 TUDOR DR|TURING|UTAH~1961 75TH AVE|TONY|VIRGINIA|69.208 | a | 3.5 |

FIG. 4

FIG. 7B

| Analysis | | |
|---|---|---|
| Statistics  Frequencies  Meta-frequencies  Line | | |
| | D28 Body | |
| Count of distinct values | 17 | |
| Count of distinct patterns | 17 | |
| Count of empty strings | 0 | |
| Count of alphabetic strings | 0 | |
| Count of alpha-numeric strings | 0 | |
| Count of repeated-character strings | 0 | |
| Count of positive integers | 0 | |
| Count of numeric values | 0 | |
| Length of shortest string | 93 | |
| Length of longest string | 117 | |
| Minimum sort value | 103327885,ZABRINA,WIECKS,10300 W BLUEMOUND | |
| Maximum sort value | 999027000,GERARDO,COLEYONEAL,N1314 SUGAR | |
| Minimum frequency | 1 | |
| Maximum frequency | 1 | |
| Minimum numeric value | no numeric values | |
| Maximum numeric value | no numeric values | |
| Mean of numeric values | no numeric values | |
| Standard deviation | no numeric values | |
| Sum of numeric values | no numeric values | |

● Show values   ○ Show patterns

| | Frequencies | Meta-frequencies |
|---|---|---|
| 1 | 5.882% | 103327885,ZABRINA,W |
| 1 | 5.882% | 125070889,GAIGE,ZIEBL |
| 1 | 5.882% | 158828479,KEENON,MA |
| 1 | 5.882% | 184060019,KIRSTY,WHI |
| 1 | 5.882% | 282388092,GINGER,REY |
| 1 | 5.882% | 292028847,TESSIE,SIMM |
| 1 | 5.882% | 319026534,TED,MATITZ, |
| 1 | 5.882% | 481017467,TRACY,SPO |
| 1 | 5.882% | 535019838,LEENA,TUBB |
| 1 | 5.882% | 538364155,MALLARY,W |
| 1 | 5.882% | 550034614,LANCE,LOVA |
| 1 | 5.882% | 59015662,JEROD,HARIT |
| 1 | 5.882% | 605468103,BRANDT,DEE |
| 1 | 5.882% | 748178078,DENZIL,IDING |
| 1 | 5.882% | 798342082,LAMOND,RU |
| 1 | 5.882% | 995037713,MALISSA,KU |
| 1 | 5.882% | 999027000,GERARDO,C |

| | Meta-frequencies |
|---|---|
| 1  x17 | =17  100.0% |

FIG. 13

UNDERSTANDING DATA IN DATA SETS

BACKGROUND

This description relates to data sets.

A table of a typical relational database, for example, represents a dataset of records. Each record has data values in fields that have been defined for the table. Each field can have at most one value for the attribute represented by the field. The table has a unique key that distinguishes the records from one another unambiguously. The relationships of the tables of the database are normally defined in advance and all of the data and the tables are represented in a commonly shared native format. In addition to performing transactions in the database, a user typically can view the records of each table, and combinations of data contained in related tables through an interface provided by a database application.

Sometimes, related data of an enterprise are not held in a predefined well-disciplined database but are generated as separate files, data sets, or data streams that may have different unrelated formats. Although the data in each of these sources may be construed as records, the delimitation of the records into fields, for example, may not be defined within the sources. Sometimes the data in different sources, though related, may be inconsistent or repetitive.

U.S. Pat. No. 7,512,610, issued Mar. 31, 2009, owned by the same company as this patent application, and incorporated here by reference in its entirety, described a way to process a source file, data stream, or data set, to make its data easily accessible and viewable as records that can be manipulated and analyzed by a user.

SUMMARY

In general, in an aspect, there are two or more data sets. Each of the data sets contains data that can be interpreted as records each having data values for data fields. Each of the data sets contains at least some data that is related to data in at least one of the other data sets. The data in different ones of the data sets is organized or expressed possibly differently. Each of the data sets is susceptible to a definition of a key for the records of the data set. The data sets are characterized by repetitions of at least one of (a) records, (b) portions of keys, or (c) instances of values for data fields. Information about at least one of the repetitions is provided to a user.

Implementations may be characterized by one or more of the following features. At least one of the data sets includes a file having a file format. At least two of the data sets include files having different file formats. Information is received from a user about the manner in which data of at least one of the data sets may be interpreted as records each having data values for data fields. Information is received from a user from which the key for each of the data sets can be determined. The key of one of the data sets has a defined hierarchical relationship with the key of another of the data sets. The repetitions of records include duplicate records in one of the data sets. The repetitions of portions of keys include values of a key of one of the data sets corresponding to two different values of a portion of a key of another one of the data sets. The repetitions of instances of values for data fields include two or more instances of values being included in a given field. The user is enabled to perform at least one of marking, unmarking, filtering, unfiltering, and frequency analysis for values of records of at least one of the data sets.

Providing of the information to the user includes displaying the information. Displaying includes displaying records of the data sets, identifications of the fields of the records, and indications of the repetitions in data sets. Displaying of information about the repetitions includes displaying repeated instances of values for data fields. Displaying of information about the repetitions includes noting the existence of repeated records in a data set. Displaying of information about the repetitions includes noting the existence of repetitions of a portion of a key.

Providing information to the user includes enabling the user to create an integrated file of records that includes the data of the data sets and information about the repetitions. The integrated file contains records governed by a key. The key of the integrated file includes a hierarchical concatenation of fields of the data sets. The repetitive data values are included in a given field of a record of the integrated file. Records of the integrated file are displayed to the user. Views are displayed of the data of the integrated file that correspond to the data of the data sets from which the integrated file was created. The method of claim also enabling a user to perform at least one of marking, unmarking, filtering, unfiltering, and frequency analysis for values of records of at least one of the data sets. A user is enabled to perform at least one of marking, unmarking, filtering, unfiltering, and frequency analysis for values of records of the integrated file, the marking, unmarking, filtering, and frequency analysis being applied automatically to the other views of the data In general, in an aspect, a data set is received containing data that can be interpreted as records each having data values for data fields. The data set is characterized by any arbitrary number of repetitions of instances of values for at least one of the data fields. Information about at least one of the repetitions is provided to a user. The data set includes a file having a file format. Information is received from a user about the manner in which data of the data set may be interpreted as records each having data values for data fields. Information is received from a user from which a key for the data set can be determined. The user is enabled to perform marking, unmarking, filtering, unfiltering, and frequency analysis for values of records of the data set. The providing of the information to the user includes displaying the information. The displaying includes displaying records of the data set, identifications of the fields of the records, and indications of the repetitions in data set. The displaying of information about the repetitions includes displaying repeated instances of values for data fields.

In general, in an aspect, a medium bears an integrated file of data records and a key for the records. Each of the records contains at least one data value for at least one data field. The data records contain information that represents data of at least two data sets. Each of the data sets contains data that can be interpreted as records each having data values for data fields. Each of the data sets contains at least some data that is related to data in at least one of the other data sets. The data in different ones of the data sets are organized or expressed possibly differently. Each of the data sets is susceptible to a definition of a key for the records of the data set. The data sets being characterized by repetitions of at least one of (a) records, (b) portions of keys, or (c) instances of values for data fields. The integrated file includes information that identifies the repetitions.

These and other aspects and features and combinations of them may be expressed as methods, processes, apparatus, program products, databases, methods of doing business, systems, means for performing functions, and in other ways.

Other advantages and features will be apparent from the following description, and from the claims.

DESCRIPTION

FIG. 1 is a block diagram.
FIGS. 2 through 14 are screen shots.

As shown in FIG. 1, here we describe ways to process 12 independent data sets, files, or data streams 10 (sources) such as (but not limited to) flat files, IMS*, MQ, ODBC, and XML. The data sources may (a) contain related data, (b) have different organizational schemes and formats, and (c) include repetitive data. The processing described here enables users 14 to access, display, analyze, and manipulate the data display through a user interface 16. In some implementations, at least some of the processing is done based on information about the data sources provided by users. In some cases, the processing provides for access, display, analysis, and manipulation of data in records of the data sources themselves. In some implementations, an integrated file 18 is created from the source files and provides additional access, display, analysis, and manipulation capabilities for the user. The features can be provided without requiring programming or scripting by the users.

Implementations of at least some of the features described here, and others, are found in the commercial product called Business Data Tool™, available from MioSoft Corporation of Madison, Wis. That product and its manuals and description are incorporated here by reference.

Figure 2:
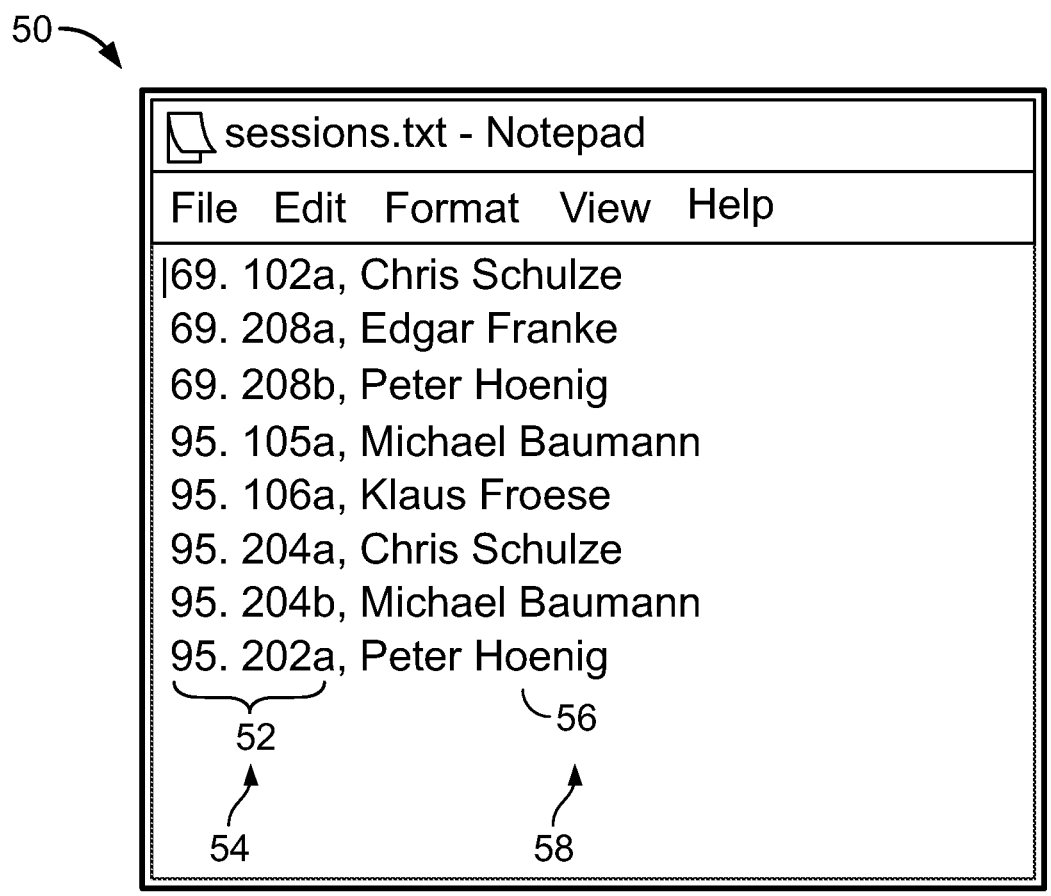

As one example of the data sources to be processed, consider three separate but related data sets (in this case contained in three data files), at least some of which are shown respectively in FIGS. 2, 3, and 4. The records of the three source data files contain information about, respectively, instructors of sessions of certain computer courses, the name of each course, and students registered for courses. We sometimes refer to data sets as files when they are expressed in predefined file formats (such as .txt or .csv). But the techniques that we describe here are broadly applicable to any kind of data set, file, or data stream in which the data can be construed as records. In some cases the delimiters of the records are predefined in the data source. In other cases, the records and their delimiters are inferred from the data source with or without assistance by a user.

We sometimes use the words file and data set (and other terms) interchangeably in a very broad sense to include any set of data of any kind, source, format, length, size, content, or other characteristics. The data set can be an organized array of data or a stream of unorganized data (or a combination of the two) that can be parsed or analyzed to infer what can be called records and delimiters of records. We mean the phrase "record of a data set" to include, very broadly, any group of data of the data set that encompasses one or more values for attributes associated with fields of the data set.

In this example, FIG. 2 shows data of a plain text file called sessions.txt. The file can be construed as including records 50 each of which includes one value 52 in a field 54 that represents a combination of a course number (69.102, for example) and a session letter of that course (such as a or b, which could correspond for example to a first semester and a second semester or to two different sections of the course given in a single semester). A second value 56 of each record in a second field 58 represents the name of the instructor (e.g., Chris Schulze).

The second file, called courses.csv and shown in FIG. 3, is expressed in comma-separated-variable (.csv) format and has records 60 each of which includes a value 61 in one field 62 identifying a course number and a corresponding value 63 in a second field 64 representing the name of the course. For example, course 69.102 has the name Data Migrator.

The third file, called students_with_addresses.csv and shown in FIG. 4, is also expressed in .csv format. Its many fields (not all shown in FIG. 4) contain values that include a value 69 of an identifying number 70 for each student (column A), a value for a first name 72 (column B), a value for a surname 74 (column C), values for one or more addresses 76, 78 separated by a tilde character (column D), a value for an identifier 80 for a session of a course (column E), and a value for a course number (column H, not shown), among others.

The three source files contain related information. For example, course numbers are used in all three files. And session identifiers (a or b) are used in the sessions.txt file and the students_with_addresses.csv file. However, the relationships among some kinds of information that appear in the three files, and in particular the nature and amount of repetition of information, are not easily understood by looking at the three separate files.

Here we describe tools that enable a user, without doing any programming or scripting or engaging in a detailed analysis of all of the relationships among the information contained in the three files, to quickly and easily have the three files analyzed and their records displayed in a way that enables the user to understand the nature and amount of repetition of information that occur in the three files, among other things.

Although the three files shown in this example contain only a relatively small number of records, the same approach could be applied to files that contain very large numbers of records (millions or even billions) and are drawn from widely distributed sources, including sources that may not all be under control of the same party. The different files or sets of records can be expressed in completely different file formats or in some cases without any formal file format.

We first describe a tool that analyses and displays repetition information (among other things) about each of the files and enables the user to quickly observe and navigate properties of the records of the files by invoking simple features of a user interface. An example of the user interface 16 is shown in FIG. 5.

Figure 5:
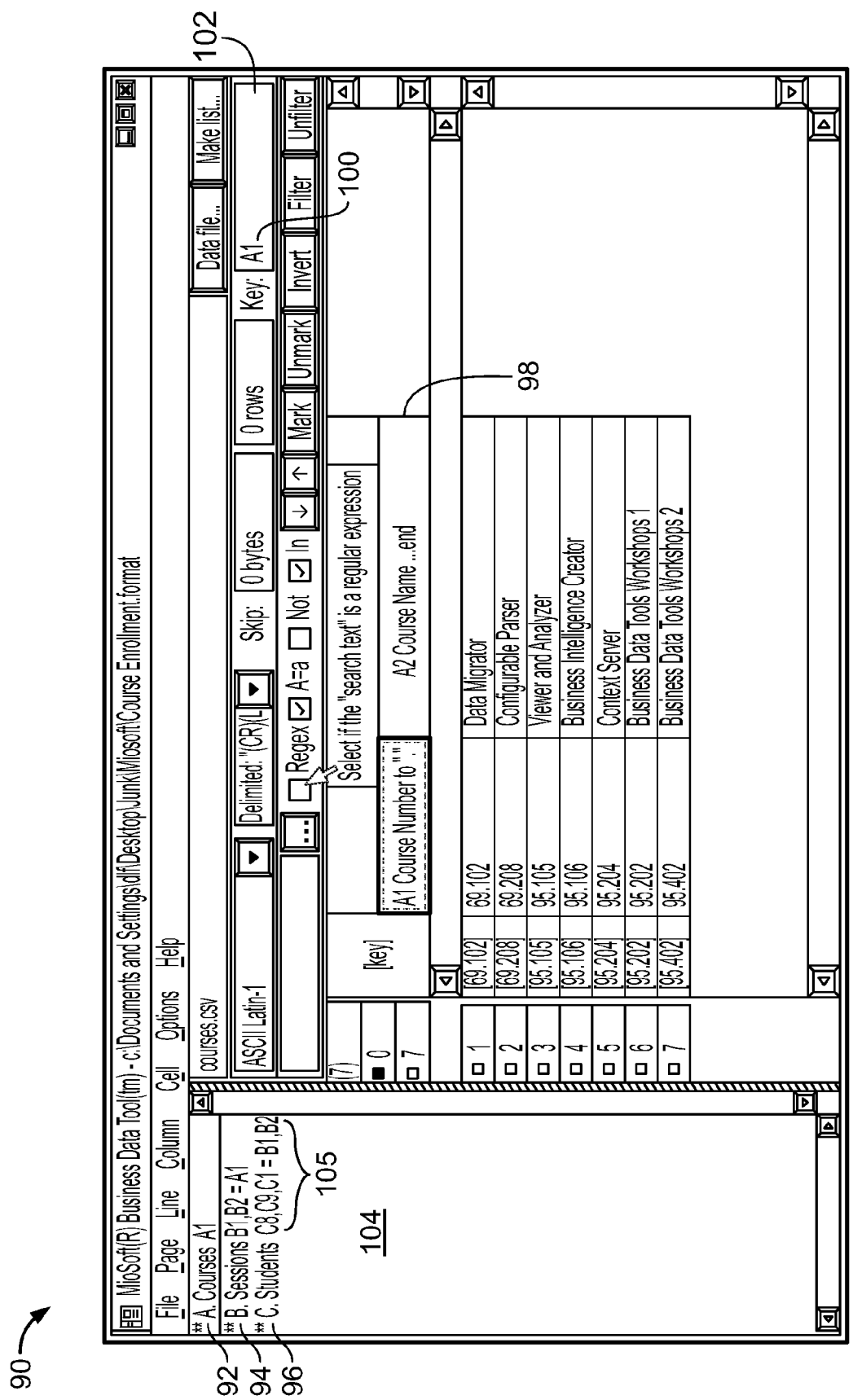

FIG. 5 represents the state of the user interface (here numbered 90) and of the software application 12 (FIG. 1) after (a) the three source data files 92, 94, 96 have been imported into the software application by the user, (b) each of the files has been parsed into fields 98 (with the assistance of the user, who can identify delimiters between fields, for example), and a key 100 has been identified for the file by the user in the key box 102. Records of file A are currently being displayed in FIG. 5.

The three imported files are listed in a pane 104. The  notation next to a file indicates that, when it is highlighted and clicked the records shown in the interface are records of that file. (In some cases, discussed later, the absence of the  notation in the pane next to an entry indicates that, when the entry is invoked, the information shown in the interface is a view of data contained in files, but is not itself drawn directly from an existing file.) Clicking on the name of the file or other entry in the pane causes its records to be displayed in a scrollable records pane 106.

The user interface illustrated in FIG. 5 (and other figures) includes display features, menu items, analytical tools, and other capabilities that are described and shown in more detail in U.S. Pat. No. 7,512,610, the entire contents of which are incorporated here by reference.

In pane 104, next to the name of each file or other entry, a key 105 for that file and its relationship to other keys for at least one of the other files is shown. When each file is imported and parsed, its fields are given identifiers that are unique across all three files. For example, the file Courses is, in this example, identified as file A and its two fields are labeled as A1 and A2. The parsing of the fields can be done automatically in many cases, based on the information contained in the data source. In other cases, the user participates in identifying the fields and their delimiters.

A key for a file can be one or more fields of the file as identified by the user. For example, the user here has identified column A1, the unique course number, as the key for file A. This is reflected in the presence of the left hand column, titled [key].

Figure 6:
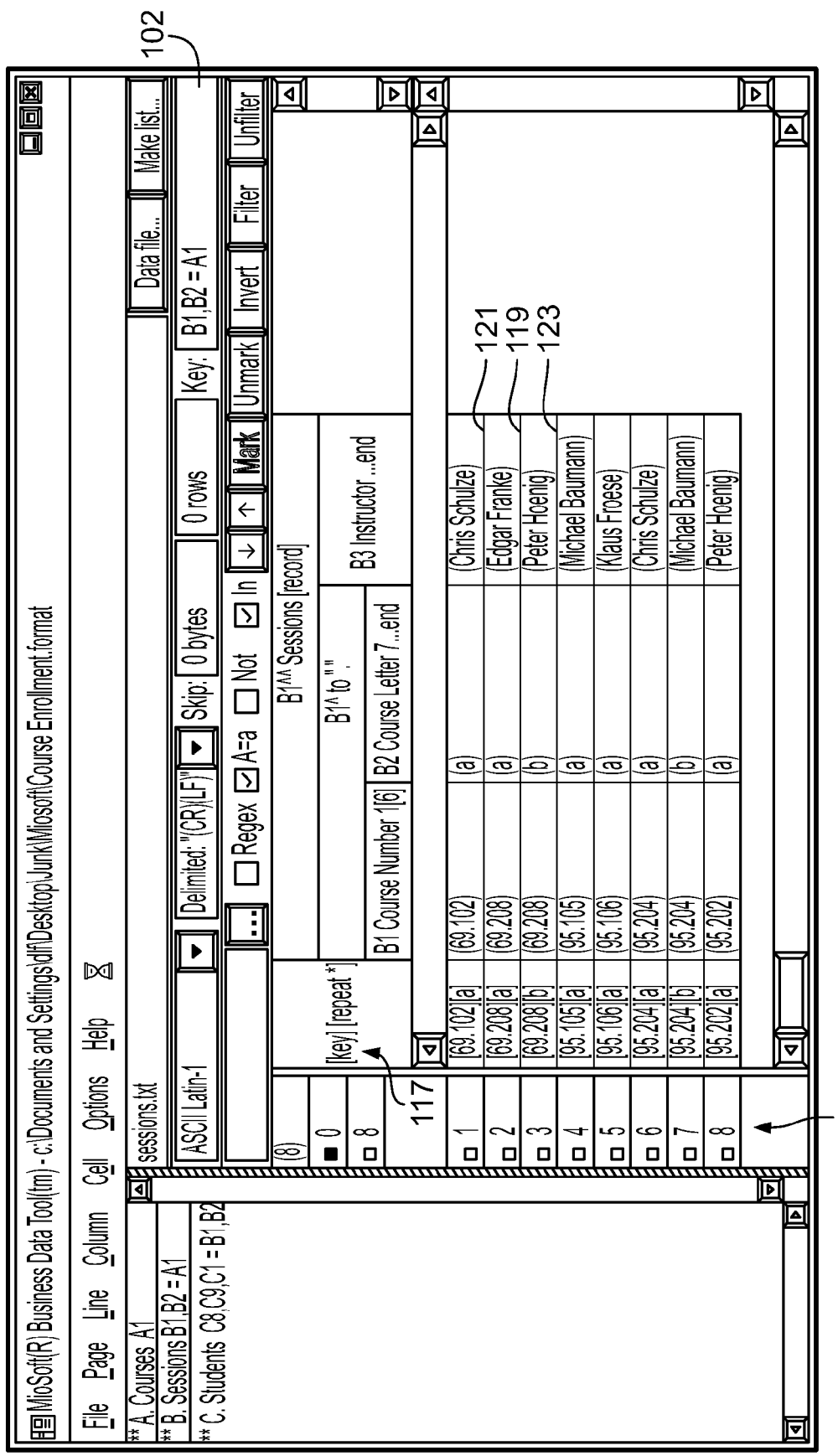

As shown in FIG. 6, the key for file B, Sessions, has been identified in box 102 by the user as a "concatenation" of columns B1 (the course number) and column B2 (the session letter). For file B, the course number alone (column B1) could not serve as a key because there can be two records bearing a given course number, one for each session or section. By "concatenating" the session letter (column B2) with column B1, a unique key can be formed. Here, when we say concatenating, we mean, for example, forming a 2-tuple from the data in the two columns. Thus, an "X" in column B1 and a "YZ" in column B2 would produce a different compound key than an "XY" in column B1 and "Z" in column B2.

The concatenated key (B1,B2) of file B is related to the key (A1) of file A. The relationship 105 is shown in pane 104 and represented by the notation B1,B2=A1. This notation expresses the fact that the key B1 is the same as the key A1 and that there is the possibility of a repetition of records that have the same value for key B1 in file B but have different values for B2. In effect B1,B2 is a hierarchical key. We refer to this hierarchical arrangement as key-level repetition. The key-level repetition is a structural feature of the three files taken together (but is not apparent by looking at file A and not necessarily easily apparent by looking at file C). The user instructs the application about the relationship of B1,B2 to A1 by entering the relationship in the key box 102 for file B.

Figure 7A:
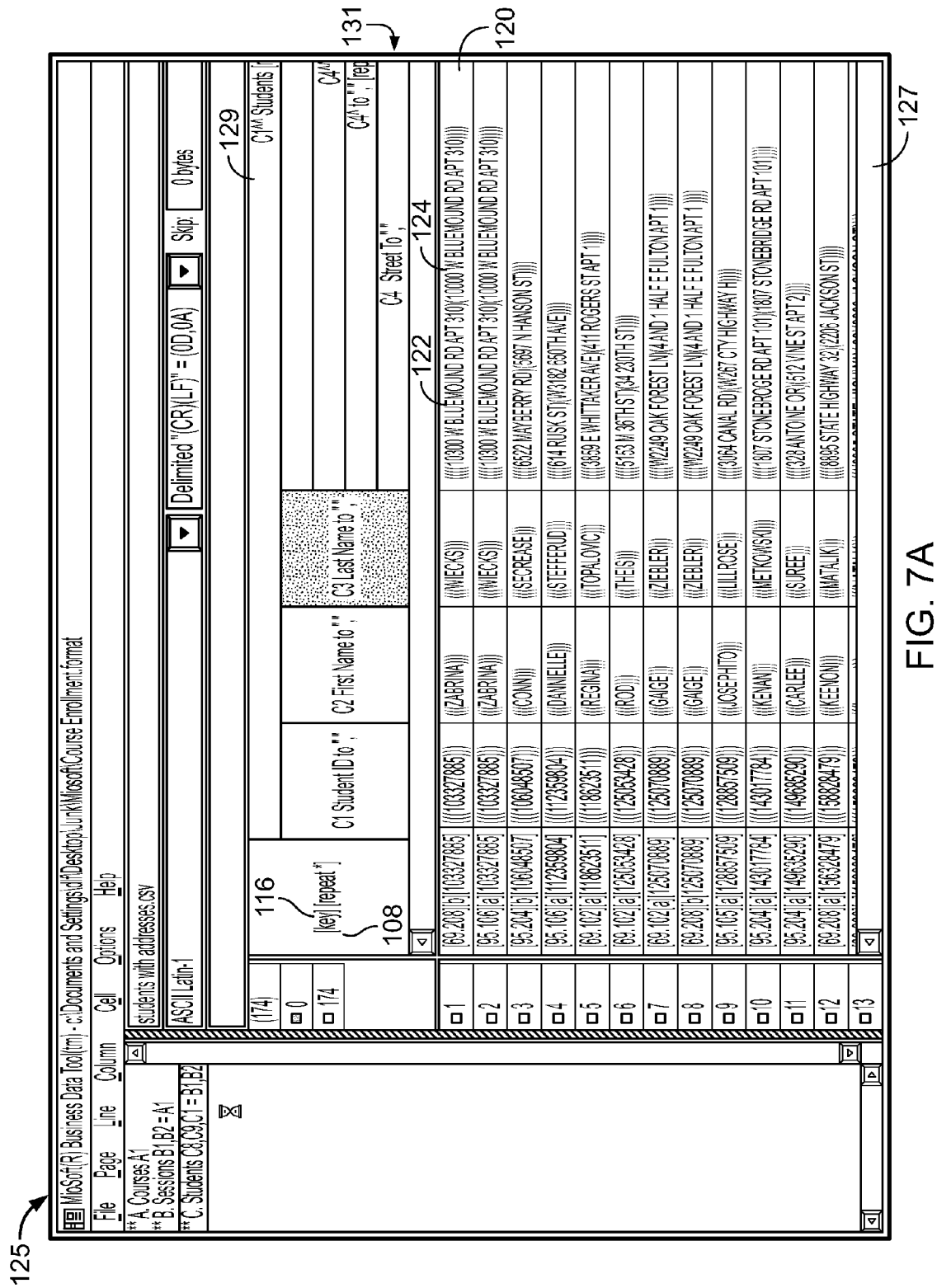
Figure 7B:
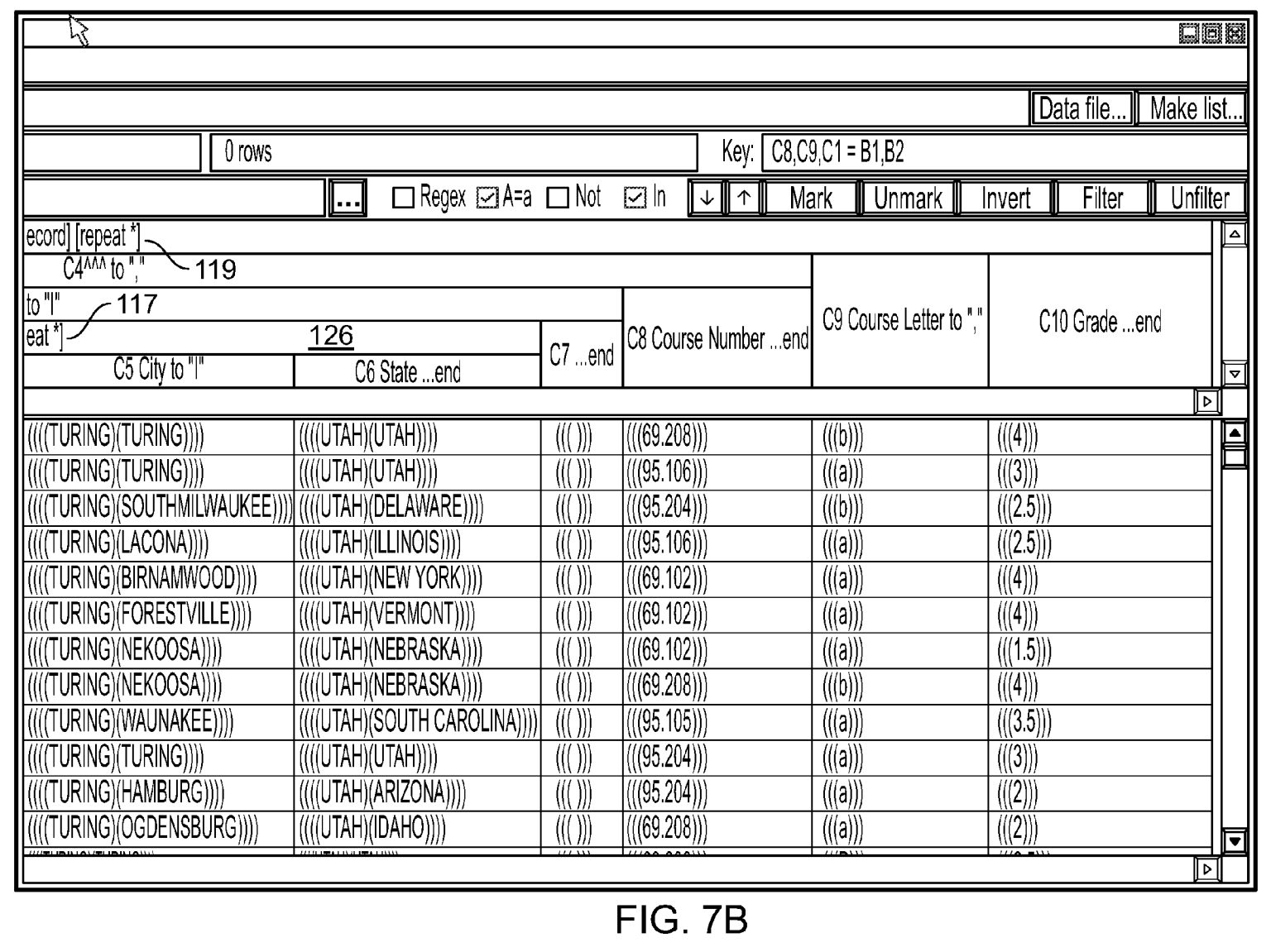

In FIGS. 7A and 7B, the students_with_addresses file C is shown. In this file, a concatenation of columns C8 (course number), C9 (session letter), and C1 (student ID) produces a unique three-level hierarchical key. C8 and C9, of course, are the same as B1 and B2 in file B, so the relationship of keys 110 can be represented as C8,C9,C1=B1,B2 to indicate that C8 and C9 are the same as B1 and B2, respectively, and that there is a further possibility of repetition of each course number and session letter combination in that concatenated key, because typically multiple students register for a given session of a given course.

In field C4 of file C, for some records 120 there are repetitions 122, 124 of instances of street addresses of students, and this possible repetition is also true of other address columns in this example. We call this field-level repetition.

In source data sets, it is also possible to have duplicate records that have the same key. In file C, for example, two records bearing the same key could have identical values in all fields (although no example of this is shown in FIGS. 7A and 7B). We call this record-level repetition. Similarly, file B might contain multiple records with the same key, perhaps to indicate a course and session that is taught by multiple instructors (an unusual arrangement). Files C and B are related by their keys, not by their records, so one should not think of a C record as having a parent B record (or multiple) but rather that a C record has a C key that has a parent B key, and B records also have B keys.

When a data set has been imported and parsed into fields and records, and the records, fields, and values are being displayed, there is a hierarchical indication in a header pane 127 (above the records pane) of the relationships of fields of the records. The uppermost header 129 spans all of the fields and represents the entire records. The headers at the level 131 immediately above the displayed records identifies each of the fields. Each of the intervening header levels shows, hierarchically, groupings of headers below it.

The repetition structure of the data sets is indicated to the user in the user interface. As mentioned earlier, key-level repetitions are called out in the pane 104 and the key box 102. A key-level repetition is identified by displaying the word "repeat" in the key header. For example, the possible repetition of the course number key A1 (of file A) depending on the session letter is indicated by the word repeat 116 that appears after the word key 118 in the header of the concatenated key column. This notation indicates to the user that the course number is a key, but there is a possibility of repetition of that key for different sessions and together B1,B2 form a unique key.

In FIGS. 7A and 7B, the field-level repetition is indicated by the word repeat 117 in the header of column C4, which tells the viewer that there can be repetitive instances of the street, city, and state address fields for a given student. The word repeat 119 in the top level header (which spans all fields) indicates the possibility of a record-level repetition, indicating to the viewer that an entire record of file C can repeat. That is, a given student may have been registered more than once in a given session of a given course.

Repetition structure is also indicated by sets of parentheses surrounding values in the records as shown in FIGS. 5, 6, 7A, and 7B. For example, in FIG. 6, in column B1 of each record, the value of the course number is enclosed in parentheses to indicate that, in file B, there can be a key-level repetition of the course number (e.g., because there may be two sessions for a given course). In FIG. 7, the values in column C2 are each surrounded by three sets of brackets to indicate that there are three possible contexts of repetition of the student first name: (1) a key-level repetition (117 in FIG. 6) implied by the relationship B1,B2=A1, indicating that there may be multiple sessions for a course, (2) a second key-level repetition 116 represented by the relationship C8,C9,C1=B1,B2, indicating that multiple students can be enrolled in a session, and (3) a record-level repetition 119 that would allow multiple student records within file C to have the same key (C8,C9,C1). In the concatenated column C4A, each value in each record also carries a fourth set of parentheses to indicate the possibility of a field level repetition, because each record can include more than one instance of a student address.

Thus, the interface illustrated in FIGS. 4 through 7 (and the related application) enables a user to import separate data sets (contained, for example, in files that have potentially different file formats or having no file format or not contained in a formal file), cause fields of the records of the data sets to be parsed, and identify keys and relationships of keys among separate files that may contain related data. The application analyzes the data sets based on the keys and indicates to the user, in a display of the records of any of the data sets, the existence of repetitions in at least three levels: key-level, field-level, and record-level. The application does not form any new files and does not merge or combine data across the data sets. However, the application does reveal to the user the fields and records of each data set and the repetitions.

The application determines how and where to put repetition information into the displayed records and headers using information provided by the user by means of a "repetition" command. The "repetition" command (available by right clicking on a header and selecting parsing, then repetition) is used to specify which elements in the header reflect repeating data. In the example, on data page B, there is a repeat indication with respect to the key because the data can have a key-level repetition with respect to A, a fact that has been indicated to the application by the user by means of the repetition command. Wherever there is a repetition in a field of a record, the displayed data of the record will include at least one set of parentheses. Parent/child parentheses that are shown nested indicate the nesting of repetitions. Sibling parentheses that are shown side by side, but not nested, are used when the data in a field of a record is actually repeating.

In the display of headers and records, the parentheses are presented by the application based on key repetitions defined by the user in the "parent" files. The "[repeat *]" notation indicates each place the user has explicitly told the application to expect (and extract) repeated data, either at the key, record, or field level. If the user does not specify repetitions, no parentheses are shown. All records are still shown, however, since no inter-record processing takes place during viewing.

The display of the "[repeat *]" notation shows where the user has asked the application to expect repeated data, whether at the level of keys, records, or fields. The parentheses are an indication by the application of how many repetitions are "above" the element in the format's hierarchical decomposition for that file and in the file's key space and key space ancestry. For performance reasons, the application does not normally combine information from multiple records when viewing ordinary files, so key-level and record-level repetitions are not faithfully presented. The parentheses are still included as a reminder of the declared repetitions, but they always appear to be singular because the information from exactly one record is being shown in each row. Field-level repetitions show authentic repetition information as a sequence of zero or more parenthesized strings (e.g., "(foo) (bar)").

As a convenience, the application visually indicates consecutive records that have the same parent key using a dim horizontal separator line. For example, in FIG. 6 the line 119 separates the 69.208a record from the 69.208b record. Because the parent key of both records is 69.208 (i.e., just column B1), the solid separator lines 121, 123 help to form a visual group of related records. When consecutive records have the same keys (e.g., both B1 and B2 the same) an even dimmer separator line is used, providing two levels of information about record grouping.

In addition, using features of the application, the user can filter, mark, and perform frequency analysis and other analytical operations on the records of the data sets that provide additional insight into the nature of the data. Many of the operations are explained in the patent referred to earlier.

Among other things, the user can perform an analysis of the portions of the data records represented by any of the headers at any level of the header hierarchy. For example, by right clicking in the header C4 street 120 of the display of the records of file C, and selecting the analysis option and then the analyze column option from the resulting pop-up menus, the user can cause the application to perform an analysis of the data in that column and display the results of the analysis, for example, in a window 150 shown in FIG. 8.

Figure 8:
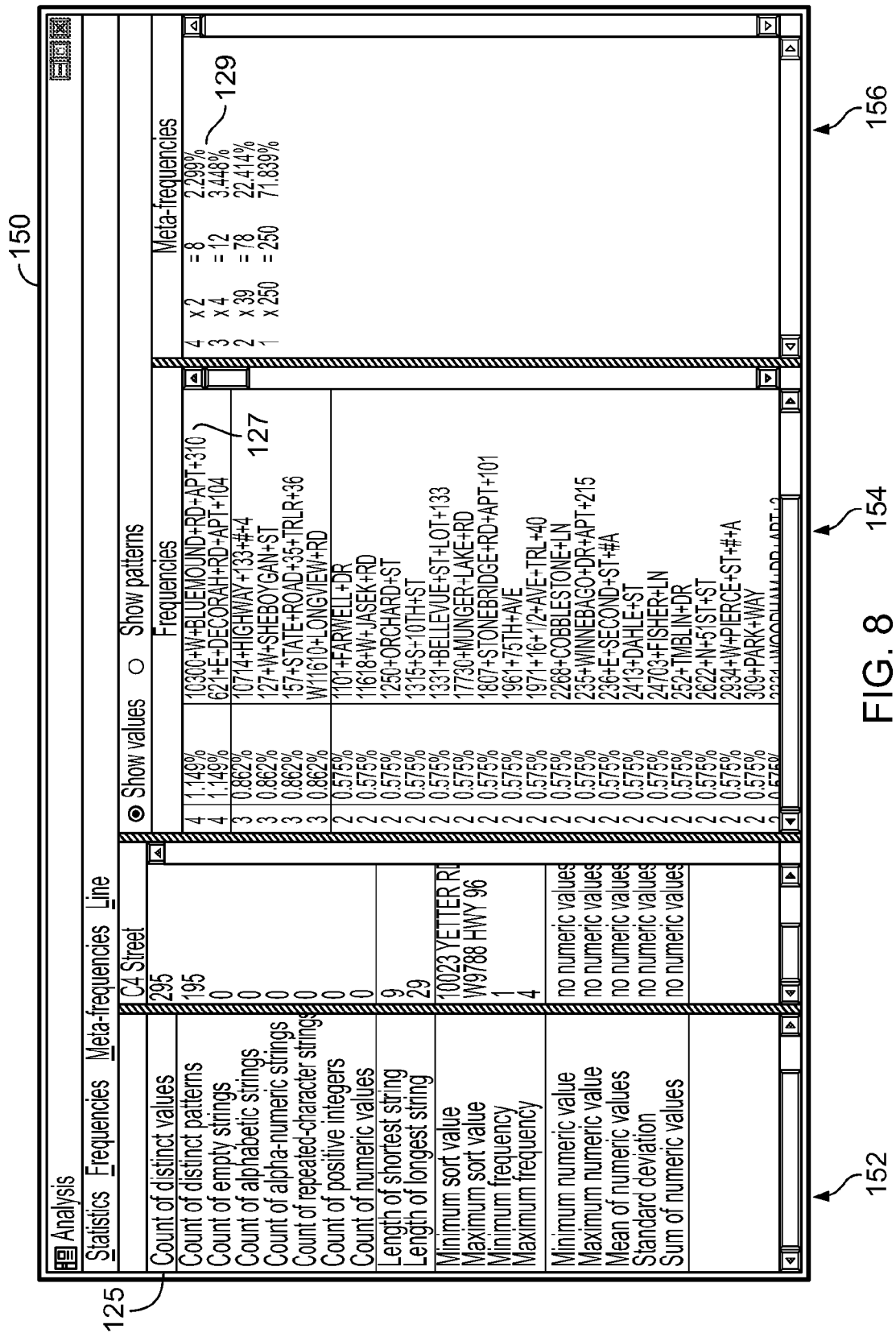

In FIG. 8, a pane 152 displays data about the values of the column street in the records of the data set. A pane 154 shows information about frequencies of occurrence of various values of street. And a third pane 156 shows meta frequencies of the frequencies of pane 156.

For example, although the file C contains only 174 records, the display pane 152 shows that the count 125 of distinct values is 295 different streets. This reflects the fact that instances of the street address can be (and in this example are) repeated in column C4 of a given record.

The pane 154 lists in ascending order of frequency the frequencies of appearances of every street address in the file, including the number of appearances, the percentages of the appearances represented by that number, and the associated values of street. For example, the first entry 127 in pane 154 indicates that the street address 10300 W. Bluemound Rd., Apt. 310 appears four times in the file C, which is 1.149% of the total number of appearances of street addresses in the file. In the pane 156, the number of times (in descending order) that a given frequency appears in pane 154 is shown as well as the total number of appearances of addresses represented by those appearances, and the percentages of the total appearances represented by that number of appearances. For example, the first entry in pane 156 indicates that street addresses that appear four times in the file C times the number of such addresses (two, in the case) equals eight, which corresponds to 2.299% of all of the appearances of street addresses in the file. On the other hand, the final entry in the pane indicates that there are 250, or 71.839% records that appear only once in the file. A similar analysis can be run and displayed for any of the columns of any of the files.

While viewing FIG. 8, if a user is interested in seeing only the records represented by one of the lines in pane 154, the user may double-click on that entry. In response, the display of records of file C changes to show only the records that contain the address that is represented by that line in the pane 154. By reviewing those displayed records, the user can infer and understand information about the records of the file and in what context the repetitions occur. The user can learn about the data values, the repetitions, the frequencies and other information for each of the data sets by repeating this process while the records of that dataset are being displayed.

In the illustrated user interface, the user can derive an understanding of the relationships among the data in the three different files. For example, in FIG. 6, the user can right click on the heading B3 instructor, then select the options analysis, and analyze column in the pop-up menus. The frequency information for instructors in those records is then displayed (but not shown here). By double-clicking on the entry that shows two records for which Chris Schulze is the instructor, the records pane is updated to show only those two records. By clicking in the mark boxes 140, both of those records are marked. Next the user can invoke a mark-across-join feature by switching to a display of the Course file A, right clicking on file A in pane 104, invoking the mark across join option, then selecting file B as the source of the marking. This causes a marking in the records pane of the two course records taught by Schulze: Data Migrator and Context Server.

The process can be repeated by the user by marking the record for the Data Migrator course in the display of the records of file B, switching the display to file C, right clicking on file C in the pane 104, selecting the mark across join option and choosing file C as the marking source. The display of the records of file C then shows as marked the records of file C of the students who are in the courses taught by Chris Schulze. By then clicking on the filter button, the user is shown only those records of the courses taught by Chris Schulze.

To summarize some of the specific examples described so far, the user can import files that have related data and are in different file formats and from different sources. The user can specify the record and field delimiters of each of the files if necessary, and the keys and key relationships for each of the files. The files may have repetitions of data at each of three levels: key level, record level, and field level. The tool can indicate the existence of levels of repetitions. In addition, using marking, filtering, and mark across join features of the application, the user can understand the relationship among elements of data in the three files. However, the process of navigating back and forth and using those functions to understand the relationships of the data elements is somewhat cumbersome.

For example, if entry 127 in pane 154 is double clicked to reveal two records that together contain the four instances of the address 10300 W Bluemound, and if the same student identification number is associated with both of those records, the user has no simple way to see more information about the sessions for which that student is registered other than by switching to a display of the sessions file and using the mark across join, filter, mark, and analytical features of the interface to find the records that show the desired information. Therefore, it is possible, but in some cases cumbersome, for the user to observe and understand the inter-relationships of the data in different data sets.

The process can be simplified and made richer by invoking a feature of the tool called join all. The join all feature processes the three files (or data sets)—which have been parsed and for which keys and their relationships have been identified by the user—to produce a new integrated file. The new file captures the data of the three source files A, B, and C in a form that permits faster and easier analysis by a user. The user causes the integrated file to be created by clicking on the menu item file and choosing the export data option and then the join all source files in the dialog box that appears.

For the records that are being joined, the join all operation creates a corresponding hierarchical record that mirrors the relationships among their keys. Because the keys are related hierarchically, the joining can be simplified by first sorting the records for each page according to their keys and then processing them sequentially. By a page we mean a portion of the file that is associated with one of the files that is joined in the join all file. For example, the original file B corresponds to a page B of the joined file. When the final joined file is created from the pages derived from the original files, an additional page is added to the format. The additional page is capable of decoding the joined records and sending each appropriate part to a corresponding page. Thus, in effect, each of the original files has been replaced by a view page that receives its information for display to the user (i.e., for use in creating a view) from another page of the join all file instead of from one of the original files.

Figure 14:
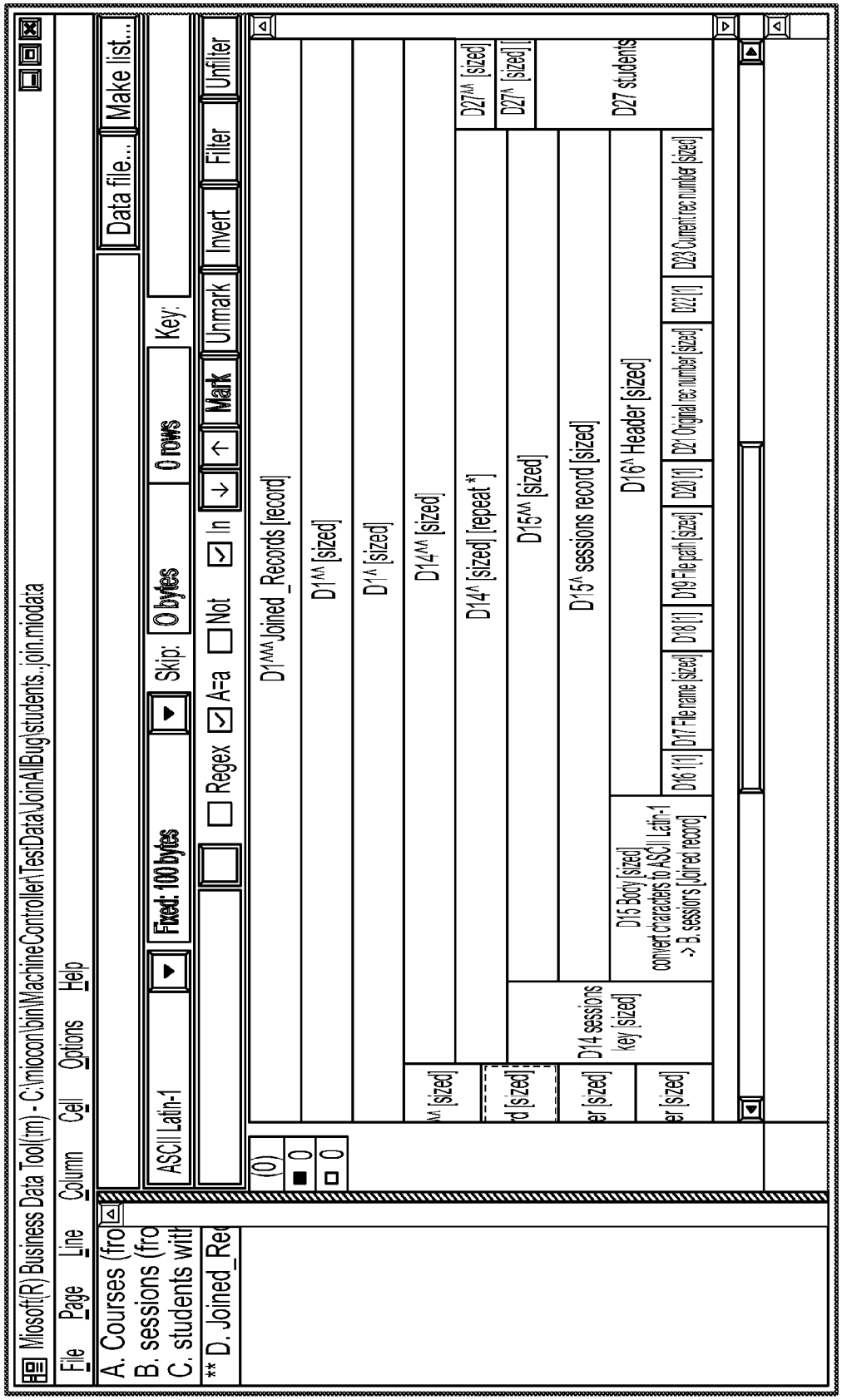

As shown in FIG. 14, the headers shown in the decode page (which is the page called **D. Joined_Records), illustrate the format of the joined records. The portion of the header structure shown in the figure shows the decoding of the records that are related to page B (by page B we mean the portion of the joined file that represents the data derived from the original sessions file B).

Beginning at the top element and proceeding downward, the header structure includes elements "D1^^^ JoinedRecords", "D1^^", "D1^", and "D14^^". The representation of the decoding of the file begins with an element "D1^^", which is a "sized" element meaning that the record contains a size field which specifies the length of the record in bytes followed by the data. (The size field itself is 4 bytes long in big-endian format.) "D1^^" and "D1^" are used to decode the records for use in data page A. "D14^^" and "D14^" are used to decode the records for use in data page B. The first element "D14^^" decodes the field that contains all the data pertaining to the data that is joined to the corresponding record that is in data page A. This element in turn contains "D14^" which has a "repeat", meaning that there can be multiple records, each being a sized record. Looking back at "D1^^" and "D1^" we see they follow the same pattern as "D14^^" and "D14^" except that "D1^" does not have a repeat. This is because that element is used to decode the root join record and as such it is not repeated. Strictly speaking, "D1^" is redundant but its presence provides a repetitive pattern that works for heirarchical joined data.

Beneath "D14^" are the elements for decoding a record of the joined data for page B. This element includes the records from page C that are joined to a specific page B record. This containment pattern is repeated for all the joined data pages.

The elements "D15^^" and "D15^" decode the data pertaining only to page B. If a record level repetition had been placed on the original data page B then "[repeat *]" would appear on element D15^. "D15^" is further composed of a body, representing the actual data, and header information. In element D15 the notation "→B. sessions [Joined record]" means the output of this element is sent to the input column of data page B.

The header that is extracted by element D16^ is further decoded by elements D16 through D23. As shown the header contains the file name, file path, and record number of the original data. It also contains the record number of the joined data. Each header field is preceded by a single byte that identifies the field.

A similar explanation would apply to other header elements that are illustrated in other figures, for example.

Figure 9:
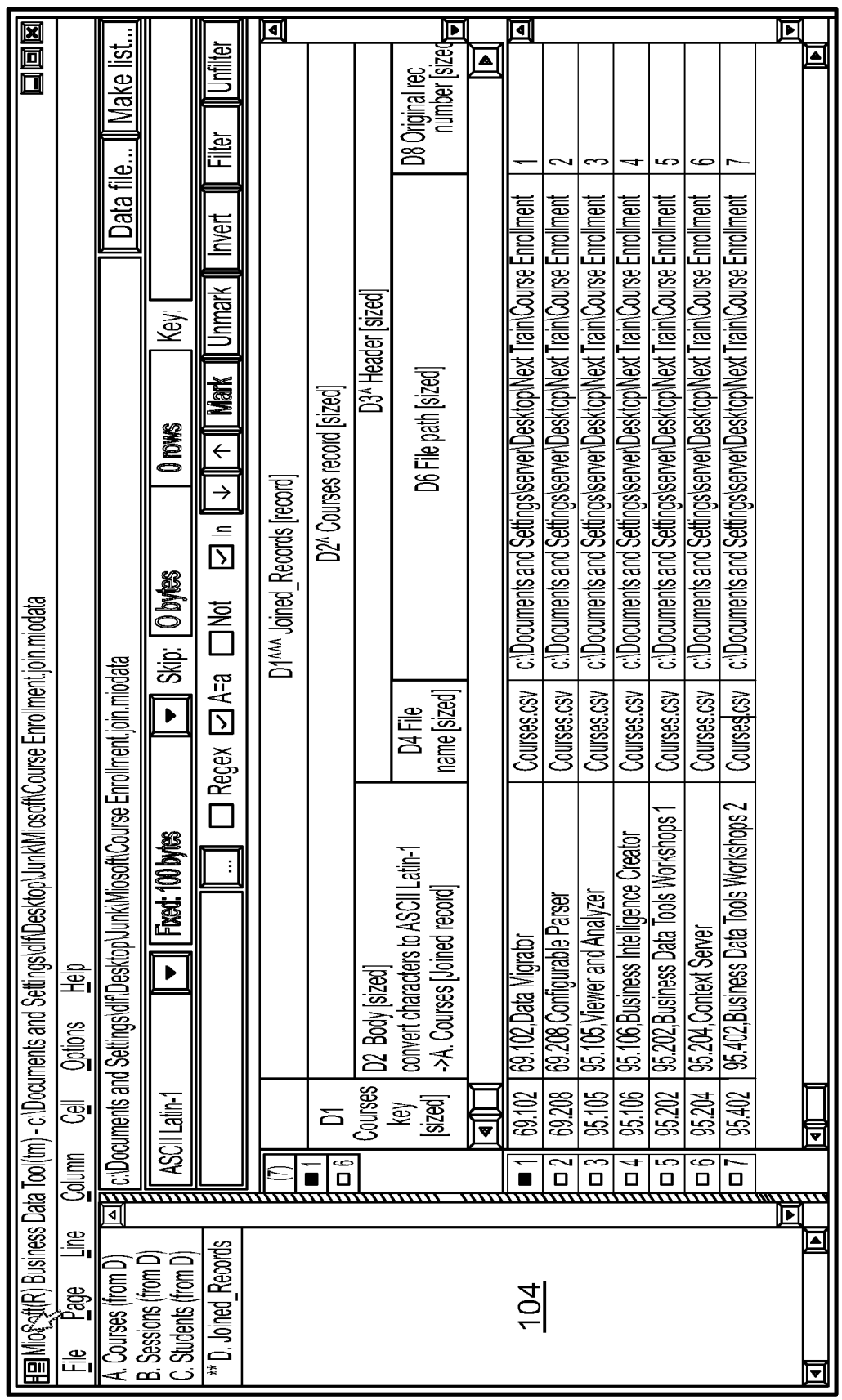
Figure 10A:
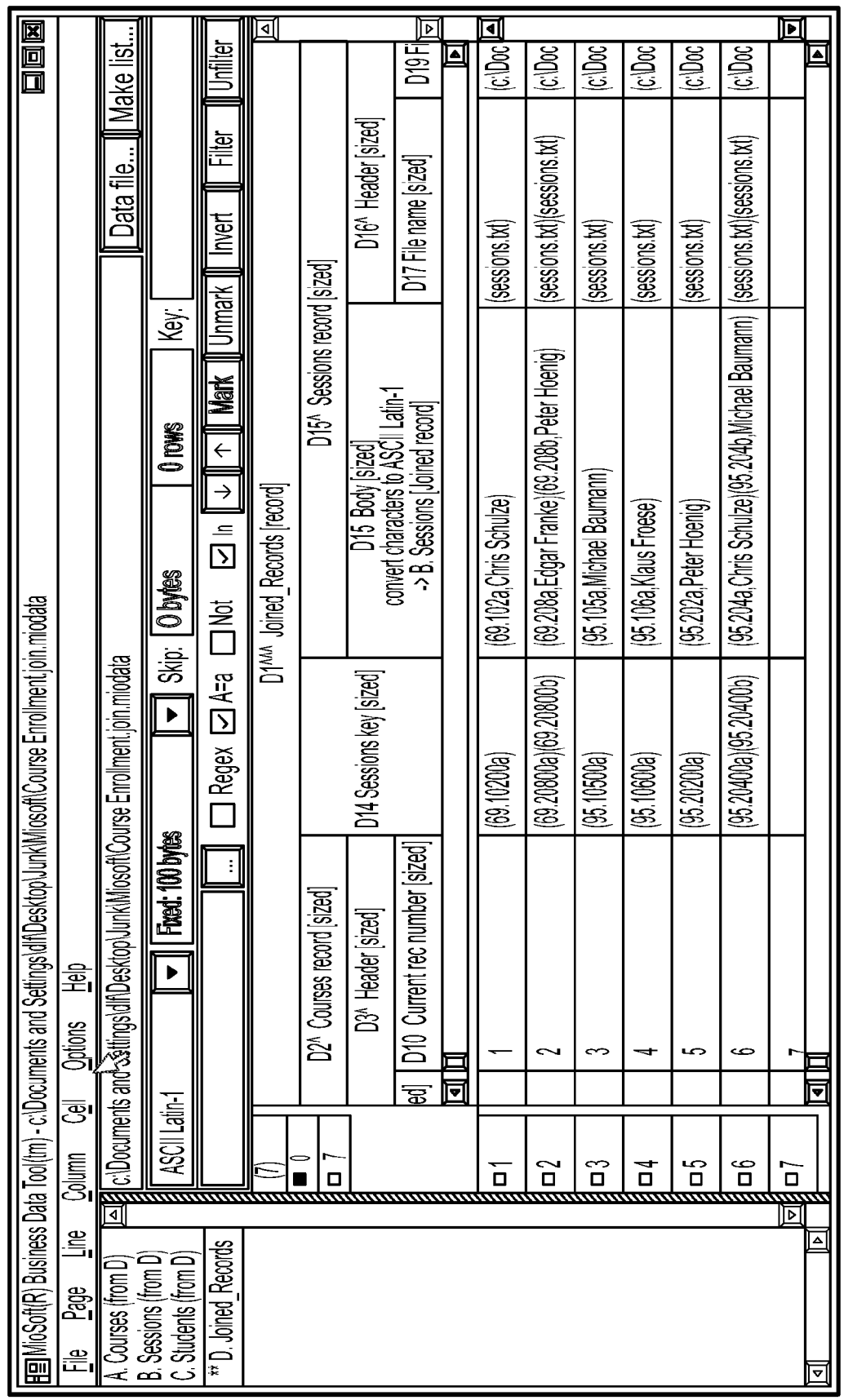
Figure 10B:
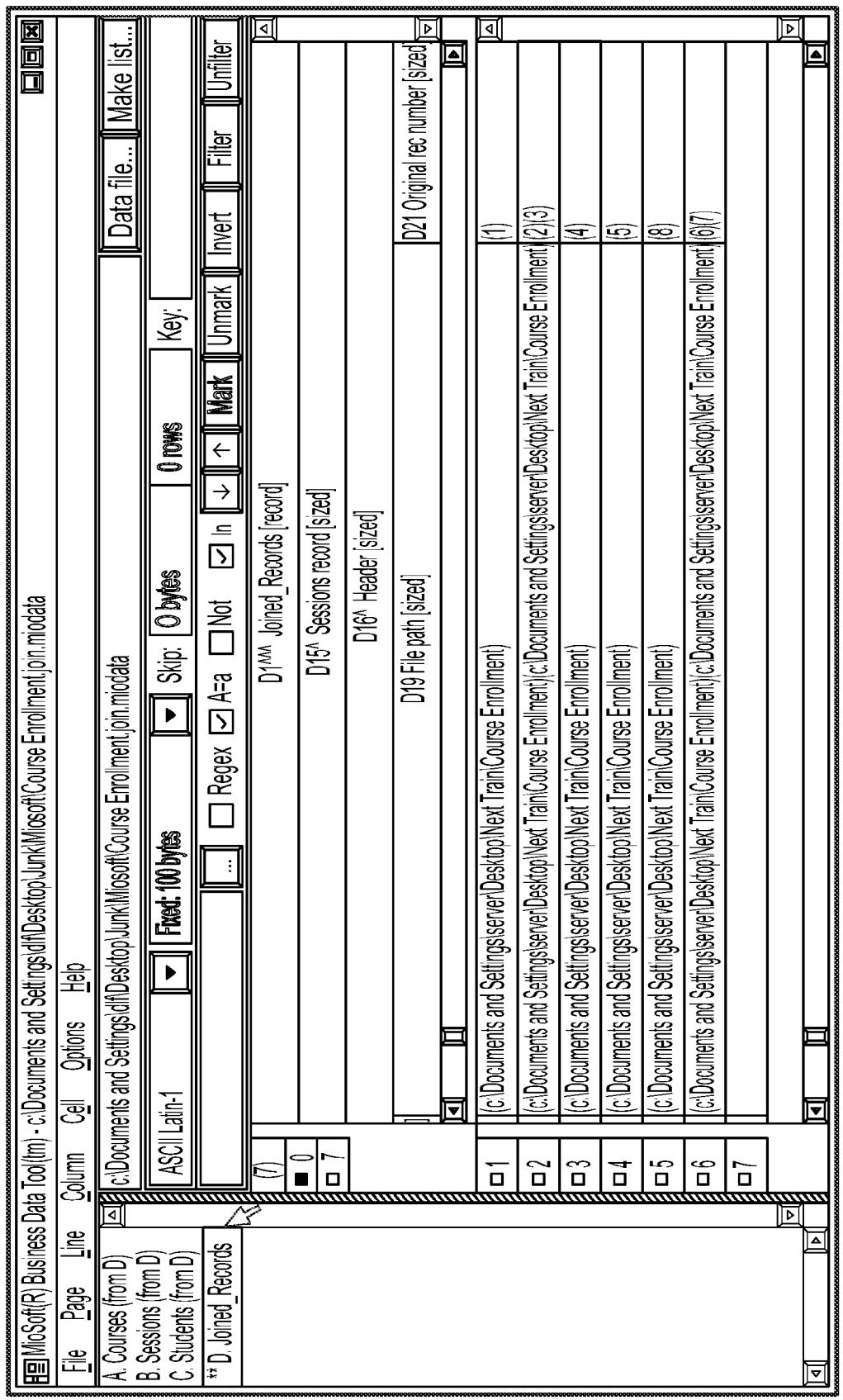
Figure 10C:
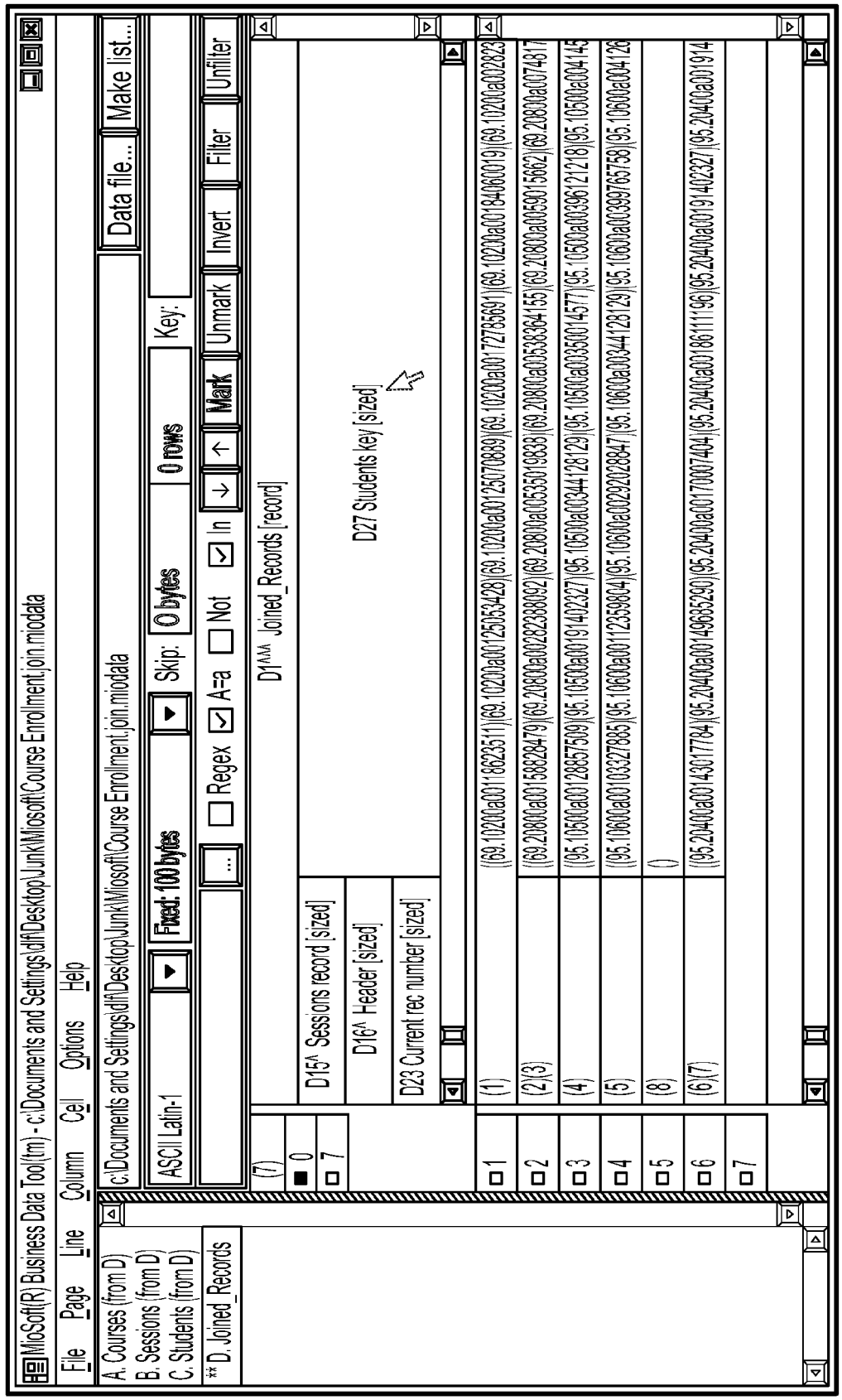
Figure 10D:
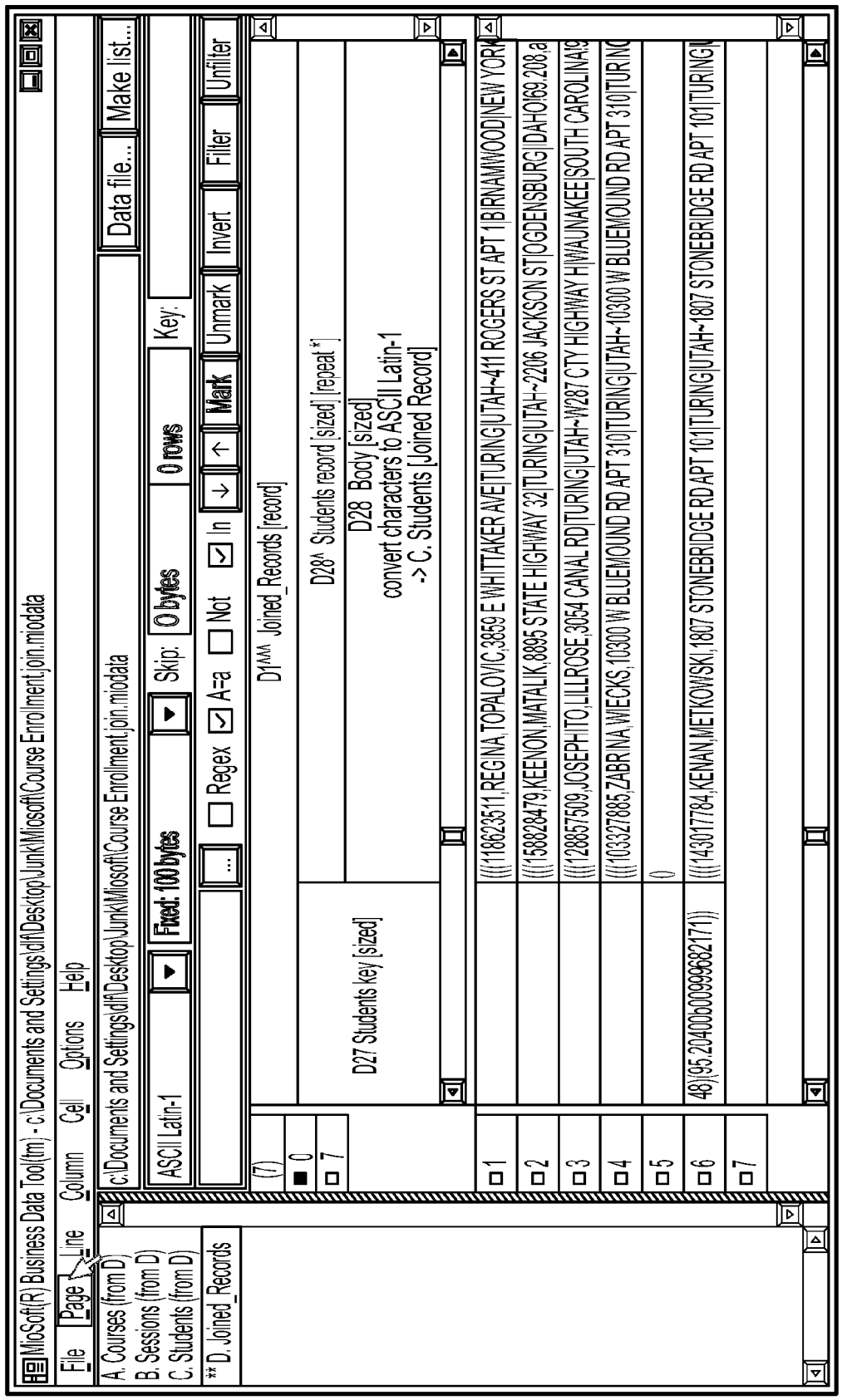
Figure 10E:
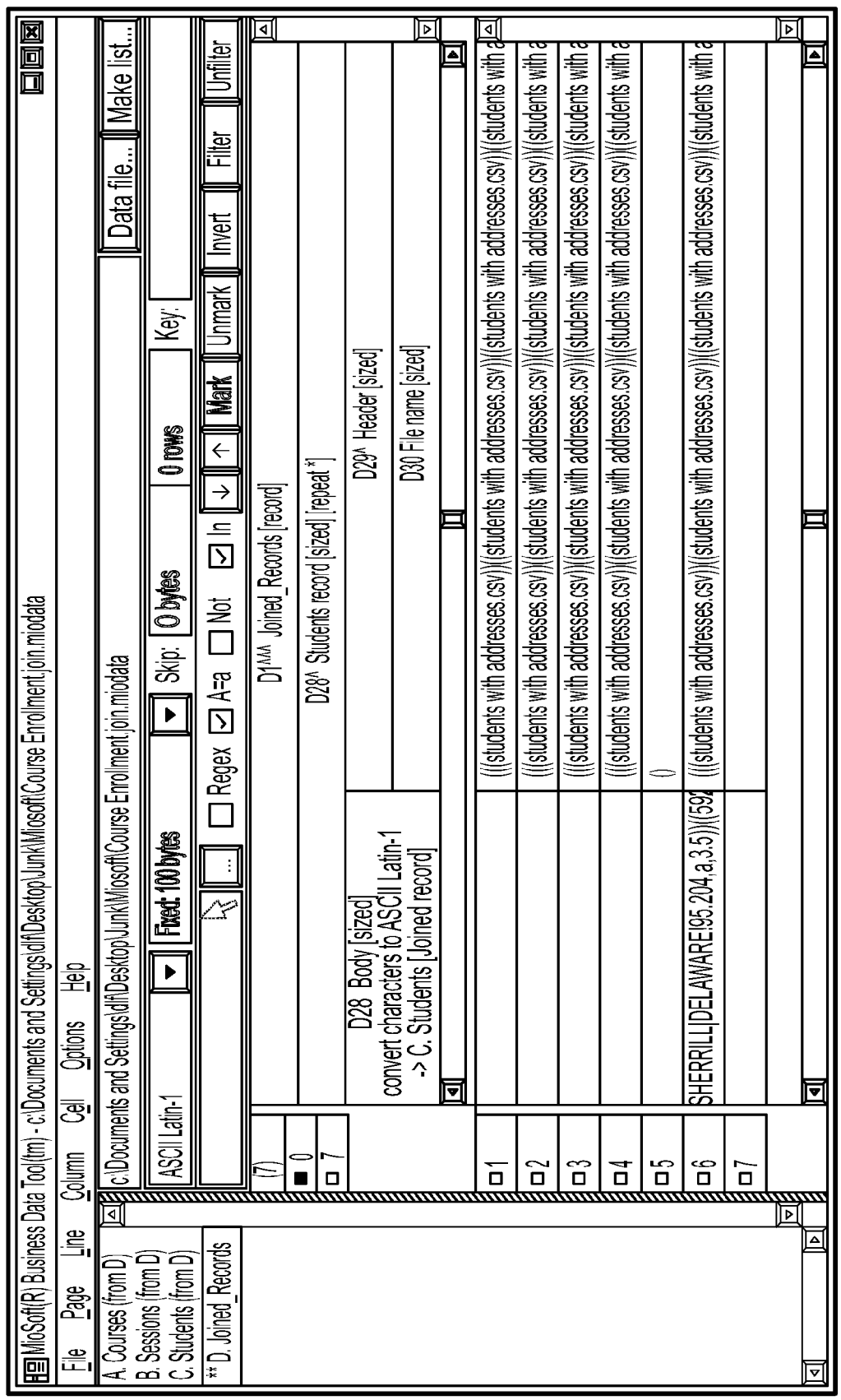
Figure 10F:
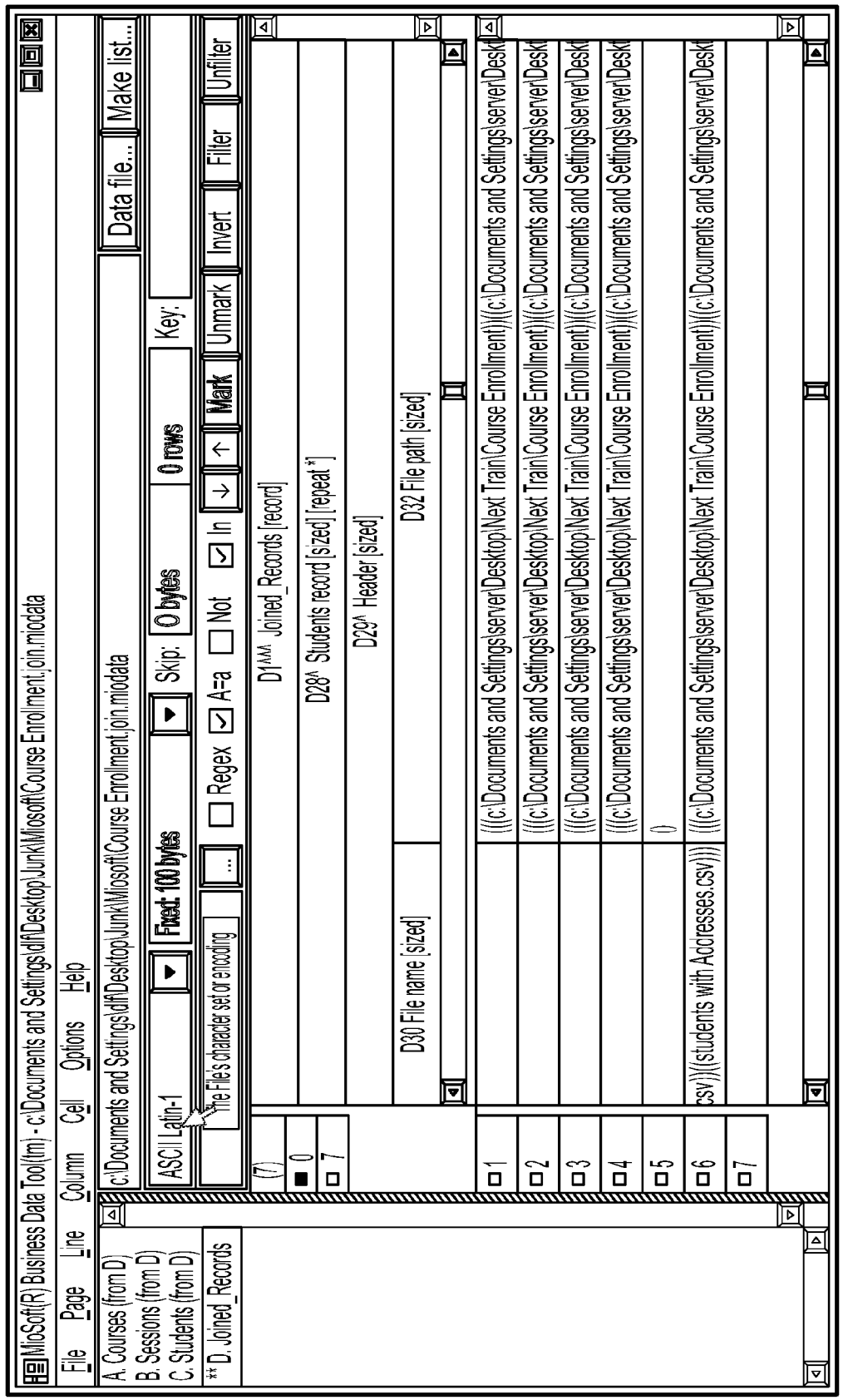
Figure 10G:
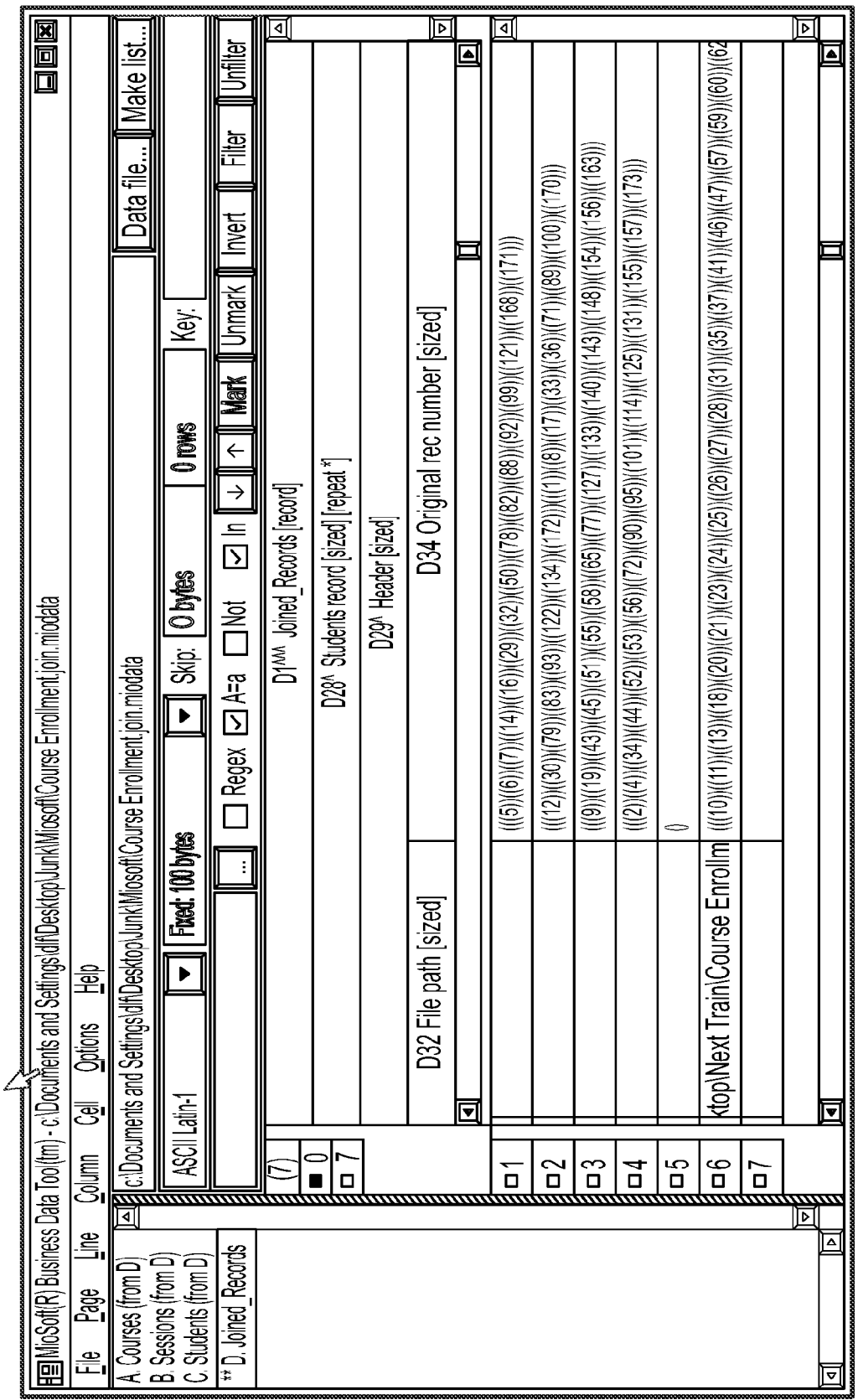
Figure 10H:
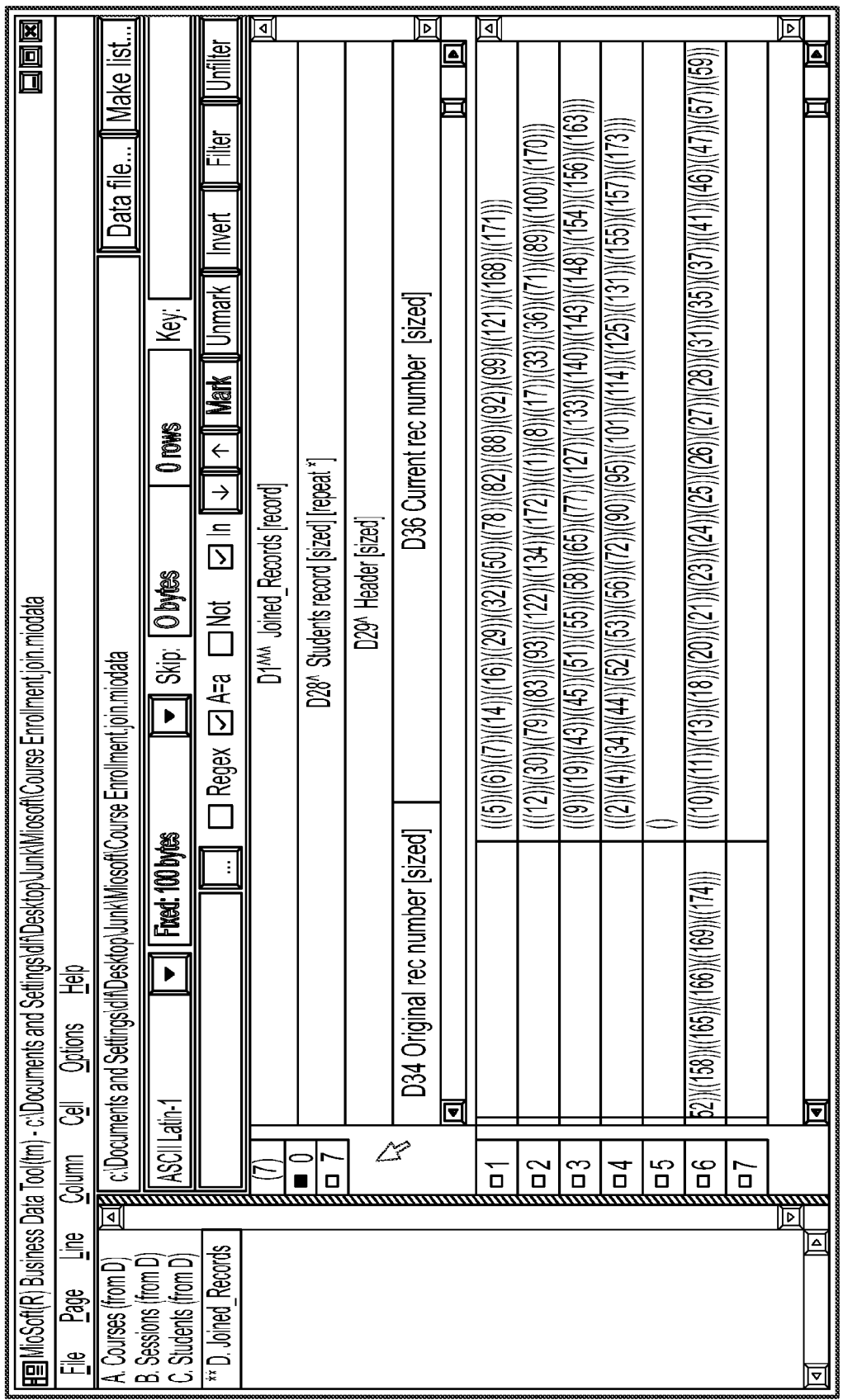

For the example that we have been discussing, FIG. 9 shows the seven records of the resulting join all integrated file which is called D. Joined_Records and is expressed, in this example, in a format called the miodata format.

As shown (in pieces) in FIGS. 10A through 10H, and indicated in the left-hand pane of those figures, the file that is being analyzed and viewed, which is indicated by two asterisks, is file D. The absence of double asterisks next to the entries for files A, B, and C, and the notation from file D indicates that when those entries are invoked and records are displayed, the records are ones that have been derived from the join_records file D rather than being direct views of the records of the three source files. For example, by clicking on the entry A in pane 104, the user is shown data that was derived from the original source file C and incorporated into the integrated file D.

File D contains exactly seven records created from the parsed and keyed source files. Each record in file D is associated with one of the courses. So, for example, column D1 contains the numbers of the seven different courses and serves as the key of the file D, as indicated by the word key in the column header. Column D2 contains the course number and course name for each course, which has been derived from (joined to) corresponding file A based on the key D1. The source of the data in column D2 is indicated in the column header by the phrase "→A. Courses [Joined record]."

Column D4 identifies the name of the file from which the data for these records was derived, column D6 the file path for the file from which the data was derived, column D8 the original record number in that file, and column D10 the current record number of the record. Columns D2 through D10 together make up what is called a courses record column D.

Column D14 contains keyed instances of the sessions of each course. For example, in record 2 of file D, there are 2 instances of sessions keys for course 69.208. The instances are separated by the separator 00 in the display for clarity. For example, "69.20800a" is really "69.208" followed by a null byte (normally shown in red as 00) followed by the letter "a". Null bytes occurring in a component of the key would be encoded as a 01 byte followed by another 01 byte. Any 01 bytes occurring in a component of the key would be encoded as a 01 byte followed by a 02 byte. This encoding preserves the sort order of compound keys and only expands the key (by more than the 00 byte separator) when a 00 or 01 byte occurs within a key component, an unlikely situation.

In column D15 Body, the names of the instructors for each of the courses and sessions are shown. A column D15 Sessions record spans columns D17, D19, D21, and D23 and captures information about the source of the sessions information. In record 2, the names of two instructors appear because there are two different sessions of course 69.208. The information in column D15 has been derived from and joined from file B (as indicated in the column header), which lists the instructor names for various sessions. Although the original file B had eight records to reflect the fact that there were eight sessions of the courses, in the file D, all eight of those records are captured in only six records of column D15, because for two of the courses, there are two sessions each and those pairs of sessions can be recorded in the same records.

Column D27 displays key information for all instances of students in each of the courses, along with associated information about the course and session in which the student is registered. As with column D14, the key information for the course, the session, and the student ID are separated by the 00 separator. Record 6, for example, holds key information for a very large number of instances of students registered in that course, each key comprising the course number, the session letter and the student ID.

Similarly, column D28 captures student address records by a join with file C. Columns D30, D32, D34, D36 capture information about the original location of the joined information.

The file D is a non-rectangular file in that, for each course record, various columns of the record can have multiple instances (repetitions) at the different levels of repetition. For example, there can be many student IDs of students registered in a course. Column D27 captures the multiple IDs and for each one the associated course and session identifiers. The information that ties the data of the source files is therefore completely captured and immediately available to permit a user to view related data in different files.

This arrangement is unlike a typical database table in which each of the records is rectangular, that is, each column has space for a single value of the attribute of that column; additional columns must be provided for additional values of that attribute. Such a table is rectangular in the sense that the lengths of all of the records, in terms of the number of entries of values, one per column, are all the same and defined by the number of columns. File D, by contrast, is non-rectangular in that the lengths of the records, in terms of the number of entries of values can be more than one per column, and therefore need not all be the same.

The application generates not only the join all integrated file in this flat form, but also the three views on the data of file D that correspond to the three source files A, B, and C. Having the data organized in non-rectangular records in file D and having the three views (A, B, and C) on the data in D permits much easier, faster, and more intuitive opportunities for a user to view and use the data in the three source files.

Figure 11:
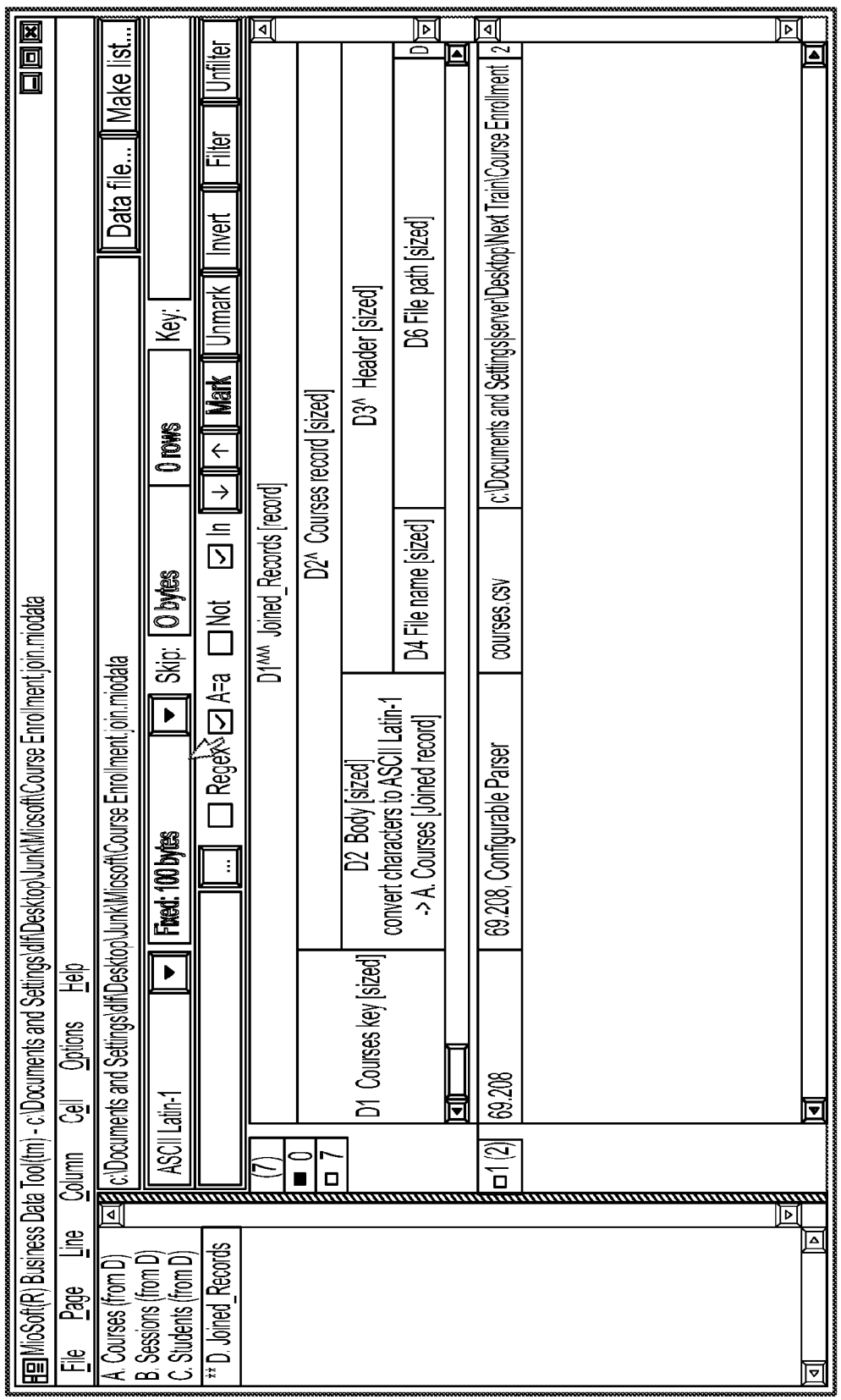
Figure 12:
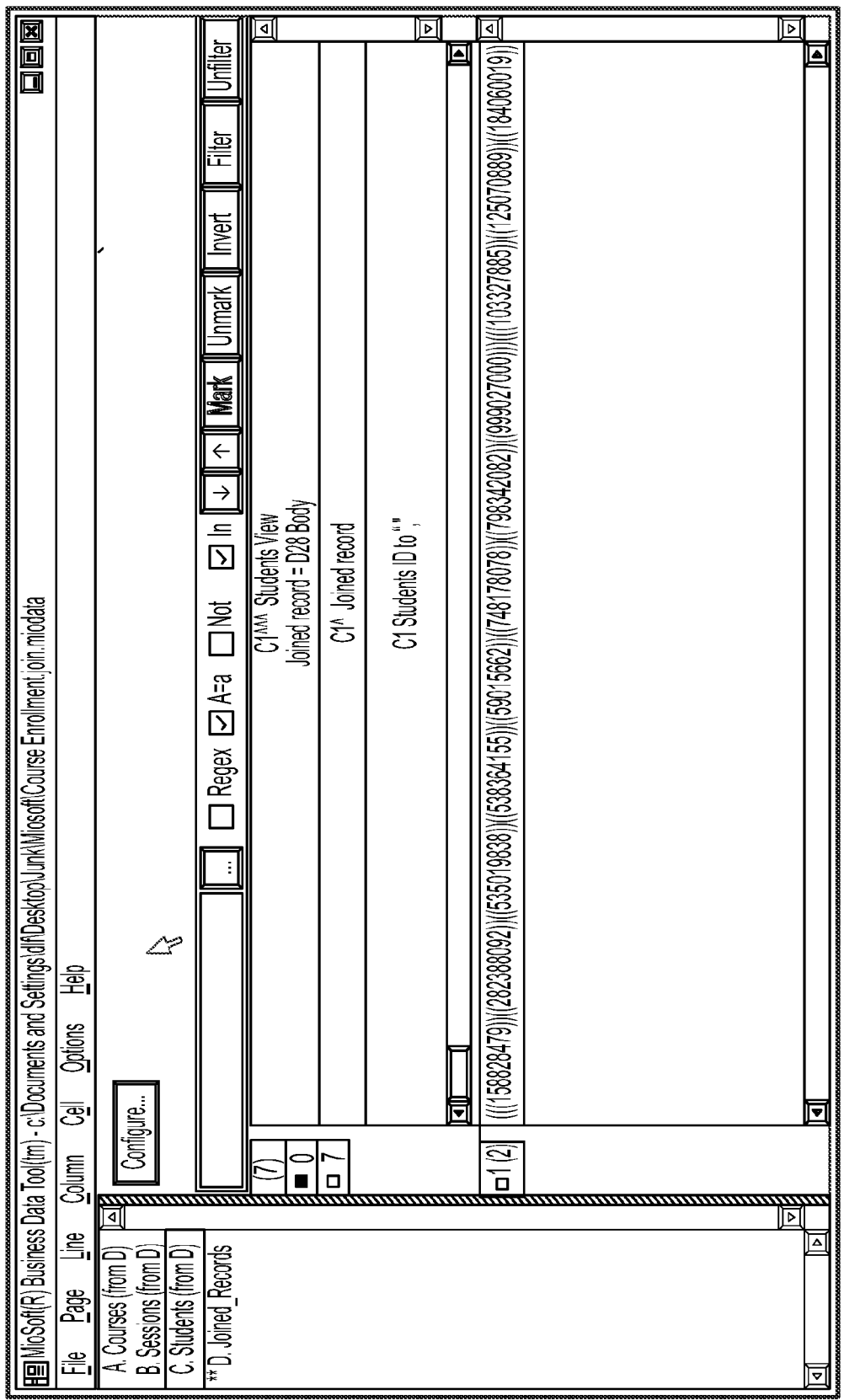

For example, as shown in FIG. 11, suppose the user is interested in the course Configurable Parser, represented by the second record of file D, and so marks that record and filters the file accordingly, leaving that single record displayed. Now suppose the user is interested in the detail about students registered in that course. By simply clicking on file C. Students in the pane 104, he is immediately presented with the data shown in FIG. 12, which is a single record showing all of the detailed information about students registered in the course. In addition, when the user causes the application to analyze the records for a given column for frequency statistics, the analysis carries over immediately among the views A, B, and C, as well as the view of file D. For example, suppose that, after marking and filtering on record 2 in file D, the user performs a frequency analysis on the student information in that record and gets the results shown in FIG. 13.

Therefore the integrated file produced by the join all feature enables the user to more easily view, analyze, and understand the data, the data sets, and their relationships, including repetitions that may exist.

The tool described here can be implemented on a wide variety of software platforms running on a wide variety of hardware configurations, using data sets and integrated files stored on a wide variety of storage devices.

Other implementations are within the scope of the claims.

For example, a wide variety of user interface styles can be used to display the records or other data of source data sets of the integrated file. Similarly, a wide variety of user interface devices can be provided to enable the user to mark and unmark records, filter or unfilter records, analyze and display frequency statistics, create and undo joins, create the integrated file, and view pieces or all of the data sets, the records, and the fields. The headings used to identify the fields could be displayed in different ways. Information about repetitions can be illustrated to the user in a variety of ways.

The invention claimed is:

1. A computer-implemented method comprising:
receiving two or more data sets,
each of the data sets containing data that can be interpreted as records, the records of each of the data sets each having data values for data fields of the records, the records of each of the data sets having at least one data field that is different from all data fields of the records of another one of the data sets, each data field being identified by a data field identifier,
at least one of the data fields of the records of each of the data sets being related to at least one of the data fields of the records of at least one of the other data sets,
the data of different ones of the data sets being organized or expressed possibly differently,
determining a key for each of the data sets based on one or more data field identifiers of data fields of the data set, the keys for different data sets being different, the data sets being characterized by repetitions of at least one of (a) records, (b) portions of keys, or (c) instances of values for data fields, the keys of the two or more data sets containing information about at least one of the repetitions, and
providing the information about at least one of the repetitions based on the keys of the data sets.

2. The method of claim 1 in which at least one of the data sets comprises a file having a file format.

3. The method of claim 1 in which at least two of the data sets comprise files having different file formats.

4. The method of claim 1 also including receiving from a user information about the manner in which data of at least one of the data sets may be interpreted as records each having data values for data fields.

5. The method of claim 1 in which the key for the records of one of the data sets has a defined hierarchical relationship with the key for the records of another of the data sets.

6. The method of claim 1 in which the repetitions of records comprise duplicate records in one of the data sets.

7. The method of claim 1 in which the repetitions of portions of keys comprise values of a key of one of the data sets corresponding to two different values of a portion of a key of another one of the data sets.

8. The method of claim 1 in which the repetitions of instances of values for data fields comprise two or more instances of values being included in a given field.

9. The method of claim 1 also including enabling a user to perform at least one of marking, unmarking, filtering, unfiltering, and frequency analysis for values of records of at least one of the data sets.

10. The method of claim 1 in which the providing of the information to the user comprises displaying the information.

11. The method of claim 10 in which the displaying comprises displaying records of the data sets, the data field identifiers of the fields of the records, and indications of the repetitions in data sets.

12. The method of claim 10 in which the displaying of information about the repetitions includes displaying repeated instances of values for data fields.

13. The method of claim 10 in which the displaying of information about the repetitions includes noting the existence of repeated records in a data set.

14. The method of claim 10 in which the displaying of information about the repetitions includes noting the existence of repetitions of a portion of a key.

15. The method of claim 1 comprising enabling the user to create an integrated file of records that includes the data of the data sets and information about the repetitions.

16. The method of claim 15 in which the integrated file contains records governed by a key.

17. The method of claim 16 in which the key of the integrated file comprises a hierarchical concatenation of data fields of the data sets.

18. The method of claim 15 in which repetitive data values are included in a given data field of a record of the integrated file.

19. The method of claim 15 also including displaying records of the integrated file to the user.

20. The method of claim 15 also including displaying views of the data of the integrated file that correspond to the data of the data sets from which the integrated file was created.

21. The method of claim 15 also enabling a user to perform at least one of marking, unmarking, filtering, unfiltering, and frequency analysis for values of records of at least one of the data sets.

22. The method of claim 15 also including displaying views of the data of the integrated file that correspond to the data of the data sets from which the integrated file was created, and enabling a user to perform at least one of marking, unmarking, filtering, unfiltering, and frequency analysis for values of records of the integrated file, the marking, unmarking, filtering, and frequency analysis being applied automatically to the other views of the data.

23. A computer-implemented method comprising:
receiving a data set containing data that can be interpreted as records, the records of the data set each having data values for data fields of the records, the data set being characterized by any arbitrary number of repetitions of instances of values for at least one of the data fields, each data field being identified by a data field identifier,
determining a key for the data set based on one or more data field identifiers of data fields of the data set, the key being different from any other key determined for any other data set and containing information about at least one of the repetitions, and
providing the information about at least one of the repetitions based on the key.

24. The method of claim 23 in which the data set comprises a file having a file format.

25. The method of claim 23 also including receiving from a user information about the manner in which data of the data set may be interpreted as records each having data values for data fields.

26. The method of claim 23 also including parsing the data of the data set based on the data fields.

27. The method of claim 23 also including enabling a user to perform marking, unmarking, filtering, unfiltering, and frequency analysis for values of records of the data set.

28. The method of claim 23 in which the providing of the information about at least one of the repetitions comprises displaying the information.

29. The method of claim 28 in which the displaying comprises displaying records of the data set, identifications of the fields of the records, and indications of the repetitions in data set.

30. The method of claim 28 in which the displaying of information about the repetitions includes displaying repeated instances of values for data fields.

31. A non-transitory medium bearing
an integrated file of data records acquired from a transitory source or a non-transitory source and applied to particular hardware to realize the functionality of the data records, the integrated file being formed by integrating at least two data sets,
each of the data sets containing data that can be interpreted as records, the records of each of the data sets each having data values for data fields, the records of each of the data sets having at least one data field that is different from all data fields of the records of another one of the data sets, each data field being identified by a data field identifier,
at least one of the data fields of the records of each of the data sets being related to at least one of the data fields of the records of at least one of the other data sets,
the data of different ones of the data sets being organized or expressed possibly differently,
each of the data sets being susceptible to a key determined based on one or more data field identifiers of data fields of the data set, the keys of different data sets being different the data sets being characterized by repetitions of at least one of (a) records, (b) portions of keys, or (c) instances of values for data fields, the keys containing information about at least one of the repetitions,
a file key for the integrated file of data records, the file key being formed based on the different keys of the two or more data sets.

32. A computer-implemented method comprising
receiving two or more data files,
each of the data files containing data that can be interpreted as records, the records of each of the data files each having data values for data fields of the records, the records of each of the data files having at least one data field that is different from all data fields of the records of another one of the data sets, each data field being identified by a data field identifier,
at least one of the data fields of the records of each of the data files being related to at least one of the data fields of the records of at least one of the other data files,
the data of at least two of the data files being expressed according to two different file formats,
determining a key for each of the data files based on one or more data field identifiers of data fields of the data files, the keys of different data files being different, the data files being characterized by repetitions of at least one of (a) records, (b) portions of keys, or (c) instances of values for data fields, the keys for the records of the two or more data files containing information about at least one of the repetitions displaying to the user records of the data files, identifications of the fields of the records, and indications of the repetitions in data files including repeated instances of values for data fields, and enabling the user to create an integrated file of records that includes the data of the data files and information about the repetitions.

* * * * *